(12) United States Patent
Nakagawa et al.

(10) Patent No.: US 10,392,677 B2
(45) Date of Patent: Aug. 27, 2019

(54) HIGH-STRENGTH HOT-PRESSED PART AND METHOD FOR MANUFACTURING THE SAME

(71) Applicant: JFE STEEL CORPORATION, Tokyo (JP)

(72) Inventors: Koichi Nakagawa, Tokyo (JP); Takeshi Yokota, Tokyo (JP); Kazuhiro Seto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 319 days.

(21) Appl. No.: 15/521,515

(22) PCT Filed: Oct. 5, 2015

(86) PCT No.: PCT/JP2015/005048
§ 371 (c)(1),
(2) Date: Apr. 24, 2017

(87) PCT Pub. No.: WO2016/063467
PCT Pub. Date: Apr. 28, 2016

(65) Prior Publication Data
US 2017/0306437 A1    Oct. 26, 2017

(30) Foreign Application Priority Data
Oct. 24, 2014    (JP) ................. 2014-217468

(51) Int. Cl.
| C21D 9/46 | (2006.01) |
| C23C 2/06 | (2006.01) |
| C23C 2/12 | (2006.01) |
| C23C 2/28 | (2006.01) |
| C21D 1/18 | (2006.01) |
| C22C 38/00 | (2006.01) |
| C22C 38/06 | (2006.01) |
| C22C 38/60 | (2006.01) |
| C21D 6/00 | (2006.01) |
| C21D 8/02 | (2006.01) |
| C21D 8/04 | (2006.01) |
| C23C 2/40 | (2006.01) |
| C22C 38/02 | (2006.01) |
| C22C 38/04 | (2006.01) |
| C22C 38/08 | (2006.01) |
| C22C 38/38 | (2006.01) |
| B21D 22/02 | (2006.01) |
| B32B 15/01 | (2006.01) |
| C21D 1/673 | (2006.01) |
| C22C 18/00 | (2006.01) |
| C22C 38/12 | (2006.01) |

(Continued)

(52) U.S. Cl.
CPC ............ *C21D 9/46* (2013.01); *B21D 22/022* (2013.01); *B32B 15/012* (2013.01); *B32B 15/013* (2013.01); *C21D 1/18* (2013.01); *C21D 1/673* (2013.01); *C21D 6/001* (2013.01); *C21D 6/002* (2013.01); *C21D 6/005* (2013.01); *C21D 8/0205* (2013.01); *C21D 8/0226* (2013.01); *C21D 8/0236* (2013.01); *C21D 8/0278* (2013.01); *C21D 8/0436* (2013.01); *C21D 9/48* (2013.01); *C22C 18/00* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/38* (2013.01); *C22C 38/60* (2013.01); *C23C 2/06* (2013.01); *C23C 2/12* (2013.01); *C23C 2/28* (2013.01); *C23C 2/40* (2013.01); *B32B 2255/06* (2013.01); *B32B 2255/205* (2013.01); *C21D 6/008* (2013.01); *C21D 2211/001* (2013.01); *C21D 2211/008* (2013.01); *Y10T 428/12757* (2015.01)

(58) Field of Classification Search
None
See application file for complete search history.

(56) References Cited

U.S. PATENT DOCUMENTS

| 2007/0163685 A1 | 7/2007 | Kusumi et al. |
| 2010/0108200 A1* | 5/2010 | Futamura ............... C21D 6/001 148/503 |

(Continued)

FOREIGN PATENT DOCUMENTS

| CN | 103221581 A | 7/2013 |
| CN | 104040008 A | 9/2014 |

(Continued)

OTHER PUBLICATIONS

Jun. 8, 2017 Search Report issued in European Patent Application No. 15851827.4.

(Continued)

*Primary Examiner* — Daniel J. Schleis
(74) *Attorney, Agent, or Firm* — Oliff PLC

(57) ABSTRACT

A high-strength hot-pressed part having a specified chemical composition, a microstructure including, in terms of volume fraction, 80% or more of a martensite phase, in a range of 3.0% to 20.0% of a retained austenite phase, a tensile strength TS of 1500 MPa or more, and a uniform elongation uEl of 6.0% or more. A method for manufacturing the high-strength hot-pressed part, the method comprising performing a heating process and a hot press forming process on a raw material steel sheet in order to obtain a hot-pressed part having a specified shape.

22 Claims, No Drawings

(51) Int. Cl.
  *C22C 38/14* (2006.01)
  *C21D 9/48* (2006.01)

(56) References Cited

U.S. PATENT DOCUMENTS

| | | |
|---|---|---|
| 2013/0048161 A1 | 2/2013 | Matsuda et al. |
| 2013/0192726 A1 | 8/2013 | Chen et al. |
| 2013/0252017 A1 | 9/2013 | Nakajima et al. |
| 2014/0065007 A1 | 3/2014 | Naitou et al. |

FOREIGN PATENT DOCUMENTS

| | | | |
|---|---|---|---|
| EP | 2 644 751 A1 | 10/2013 | |
| EP | 2660345 A2 | 11/2013 | |
| EP | 2703512 A1 | 3/2014 | |
| EP | 2 778 247 A1 | 9/2014 | |
| EP | 2 803 746 A1 | 11/2014 | |
| JP | H07-70786 A | 3/1995 | |
| JP | 2004-211147 A | 7/2004 | |
| JP | 2005-205477 A | 8/2005 | |
| JP | 2006-213959 A | 8/2006 | |
| JP | 2010-65292 A | 3/2010 | |
| JP | 2010-65293 A | 3/2010 | |
| JP | 2010-65294 A | 3/2010 | |
| JP | 2010-65295 A | 3/2010 | |
| JP | 2010-174280 A | 8/2010 | |
| JP | 2010-174281 A | 8/2010 | |
| JP | 2010-174282 A | 8/2010 | |
| JP | 2010-174283 A | 8/2010 | |
| JP | 2011-184758 A | 9/2011 | |
| JP | 2013-79441 A | 5/2013 | |
| JP | 2013-545890 A | 12/2013 | |
| JP | 2014-508854 A | 4/2014 | |
| JP | 2015-151576 A | 8/2015 | |
| KR | 2013-0140183 A | 12/2013 | |
| WO | 2006-006742 A1 | 1/2006 | |
| WO | 2011-111333 A1 | 9/2011 | |
| WO | 2012-070482 A1 | 5/2012 | |
| WO | 2012-169640 A1 | 12/2012 | |
| WO | 2015-182591 A1 | 12/2015 | |
| WO | 2015-182596 A1 | 12/2015 | |

OTHER PUBLICATIONS

Feb. 27, 2018 Office Action issued in Chinese Patent Application No. 201580057807.1.

Jan. 12, 2016 Search Report issued in International Patent Application No. PCT/JP2015/005048.

Oct. 22, 2018 Notice of Allowance issued in Korean Patent Application No. 10-2017-7010717.

Jun. 26, 2018 Office Action issued in Korean Patent Application No. 2017-7010717.

* cited by examiner

HIGH-STRENGTH HOT-PRESSED PART AND METHOD FOR MANUFACTURING THE SAME

TECHNICAL FIELD

This application relates to a part (hot-pressed part) which is manufactured by performing hot pressing on a steel sheet, and in particular, to a high-strength hot-pressed part having high strength represented by a tensile strength TS of 1500 MPa or more and high ductility represented by a uniform elongation uEl of 6.0% or more. The term "hot pressing" here refers to a process in which a heated steel sheet is rapidly cooled while being subjected to press forming by using a tool for press forming. Here, the meaning of the term "hot pressing" includes other generic terms related to this technique such as "hot forming", "hot stamping", and "die quenching".

BACKGROUND

Nowadays, from the viewpoint of global environment conservation, there is a strong demand for increasing the fuel efficiency of automobiles. Therefore, since there is a strong demand for reducing the weight of automobile bodies, particularly in the case of automotive parts, consideration is being given to increasing the strength of a steel sheet, which is a raw material for the parts. However, since formability generally decreases with an increase in the strength of a steel sheet, in the case where parts are manufactured from a high-strength steel sheet, there are problems in manufacture processes, for example, it is difficult to perform forming or shape fixability decreases.

Therefore, in response to such problems, techniques for manufacturing high-strength automotive parts and the like have been put into practice by performing a hot pressing process on a steel sheet. In a hot pressing process, a steel sheet is heated to a temperature in a temperature range in which austenite is formed, then transported to a pressing machine, and then rapidly cooled while being formed into a part having a desired shape by using a forming tool in the pressing machine. In this cooling (rapid cooling) process in the forming tool, since the microstructure of the part transforms from an austenite phase to a martensite phase, it is possible to obtain a part having not only the desired shape but also high strength.

In addition, nowadays, from the viewpoint of achieving occupant safety, there is a demand for increasing the crashworthiness of the automotive parts. Since it is thought that manufacturing a part having high uniform elongation is effective for increasing the crashworthiness of the parts, from the viewpoint of increasing the capability (impact-energy-absorbing capability) of absorbing energy at the time of a collision, there is a strong demand for a hot-pressed part having not only a high strength but also excellent uniform elongation.

In response to such a demand, for example, Patent Literature 1 proposes a hot-pressed product which is obtained by forming a steel sheet by using a hot press forming method. The hot-pressed product described in Patent Literature 1 has a chemical composition containing, by mass %, C: 0.15% to 0.35%, Si: 0.5% to 3%, Mn: 0.5% to 2%, Al: 0.01% to 0.1%, Cr: 0.01% to 1%, B: 0.0002% to 0.01%, Ti: (the N content)×4 to 0.1%, and N: 0.001% to 0.01% and a microstructure including, in terms of area fraction, martensite: 80% to 97%, retained austenite: 3% to 20%, and the remainder: 5% or less. Patent Literature 1 states that, according to the technique disclosed in Patent Literature 1, since it is possible to form a metallographic structure in which an appropriate amount of retained austenite is retained, it is possible to manufacture a hot-pressed part having increased ductility (residual ductility) inherent in the product.

In addition, Patent Literature 2 proposes a hot-pressed part having excellent ductility. The hot-pressed part described in Patent Literature 2 has a chemical composition containing, by mass %, C: 0.15% to 0.30%, Si: 0.05% to 3.0%, Mn: 1.0% to 4.0%, Al: 0.005% to 0.1%, and N: 0.01% or less, a microstructure, in which the proportion of a ferrite phase to the whole microstructure is 5% to 65% in terms of area fraction, in which the area fraction of a martensite phase is 35% to 95%, and in which the average grain diameter of a ferrite phase and a martensite phase is 7 μm or less, high strength represented by a tensile strength TS of 1300 MPa to 1450 MPa, and excellent ductility represented by an elongation El of 8% or more.

In addition, Patent Literature 3 proposes a hot-pressed part having excellent ductility. The hot-pressed part described in Patent Literature 3 has a chemical composition containing, by mass %, C: 0.20% to 0.40%, Si: 0.05% to 3.0%, Mn: 1.0% to 4.0%, Al: 0.005% to 0.1%, and N: 0.01% or less, a microstructure, in which the proportion of a ferrite phase to the whole microstructure is 5% to 55% in terms of area fraction, in which the area fraction of a martensite phase is 45% to 95%, and in which the average grain diameter of a ferrite phase and a martensite phase is 7 μm or less, high strength represented by a tensile strength TS of 1470 MPa to 1750 MPa, and excellent ductility represented by an elongation El of 8% or more.

In addition, Patent Literature 4 proposes a hot-pressed part having excellent ductility. The hot-pressed part described in Patent Literature 4 has a chemical composition containing, by mass %, C: 0.30% to 0.45%, Si: 0.05% to 3.0%, Mn: 1.0% to 4.0%, Al: 0.005% to 0.1%, and N: 0.01% or less, a microstructure, in which the proportion of a ferrite phase to the whole microstructure is 5% to 40% in terms of area fraction, in which the area fraction of a martensite phase is 60% to 95%, and in which the average grain diameter of a ferrite phase and a martensite phase is 7 μm or less, high strength represented by a tensile strength TS of 1770 MPa to 1940 MPa, and excellent ductility represented by a total elongation El of 8% or more.

In addition, Patent Literature 5 proposes a hot-pressed part having excellent ductility. The hot-pressed part described in Patent Literature 5 has a chemical composition containing, by mass %, C: 0.35% to 0.50%, Si: 0.05% to 3.0%, Mn: 1.0% to 4.0%, Al: 0.005% to 0.1%, and N: 0.01% or less, a microstructure, in which the proportion of a ferrite phase to the whole microstructure is 5% to 35% in terms of area fraction, in which the area fraction of a martensite phase is 65% to 95%, and in which the average grain diameter of a ferrite phase and a martensite phase is 7 μm or less, high strength represented by a tensile strength TS of 1960 MPa to 2130 MPa, and excellent ductility represented by an elongation El of 8% or more.

In addition, Patent Literature 6 proposes a hot-pressed part having excellent ductility. The hot-pressed part described in Patent Literature 6 has a chemical composition containing, by mass %, C: 0.18% to 0.21%, Si: 0.05% to 2.0%, Mn: 0.5% to 3.0%, Al: 0.005% to 0.1%, and N: 0.01% or less, a microstructure, in which the proportion of a martensite phase to the whole microstructure is 90% to 100% in terms of area fraction, and in which the average grain diameter of prior austenite grains is 8 m or less, high strength represented by a tensile strength TS of 1300 MPa to 1450 MPa, and excellent ductility represented by an elongation El of about 10.0% to 14%.

In addition, Patent Literature 7 proposes a hot-pressed part having excellent ductility. The hot-pressed part described in Patent Literature 7 has a chemical composition containing, by mass %, C: 0.22% to 0.29%, Si: 0.05% to 2.0%, Mn: 0.5% to 3.0%, Al: 0.005% to 0.1%, and N: 0.01% or less, a microstructure, in which the proportion of a martensite phase to the whole microstructure is 90% to 100% in terms of area fraction, and in which the average grain diameter of prior austenite grains is 8 µm or less, high strength represented by a tensile strength TS of 1470 MPa to 1750 MPa, and excellent ductility represented by an elongation El of about 9.5% to 12%.

In addition, Patent Literature 8 proposes a hot-pressed part having excellent ductility. The hot-pressed part described in Patent Literature 8 has a chemical composition containing, by mass %, C: 0.30% to 0.34%, Si: 0.05% to 2.0%, Mn: 0.5% to 3.0%, Al: 0.005% to 0.1%, and N: 0.01% or less, a microstructure, in which the proportion of a martensite phase to the whole microstructure is 90% to 100% in terms of area fraction, and in which the average grain diameter of prior austenite grains is 8 µm or less, high strength represented by a tensile strength TS of 1770 MPa to 1940 MPa, and excellent ductility represented by an elongation El of about 8.0% to 11%.

In addition, Patent Literature 9 proposes a hot-pressed part having excellent ductility. The hot-pressed member described in Patent Literature 9 has a chemical composition containing, by mass %, C: 0.35% to 0.40%, Si: 0.05% to 2.0%, Mn: 0.5% to 3.0%, Al: 0.005% to 0.1%, and N: 0.01% or less, a microstructure, in which the proportion of a martensite phase to the whole microstructure is 90% to 100% in terms of area fraction, and in which the average grain diameter of prior austenite grains is 8 µm or less, high strength represented by a tensile strength TS of 1960 MPa to 2130 MPa, and excellent ductility represented by an elongation El of about 8.0% to 10%.

In addition, Patent Literature 10 proposes a high-strength hot-pressed part which is obtained by performing hot pressing. The high-strength hot-pressed part described in Patent Literature 10 has a chemical composition containing, by mass %, C: 0.12% to 0.69%, Si: 3.0% or less, Mn: 0.5% to 3.0%, Al: 3.0% or less, and N: 0.010% or less, in which the relationship Si+Al≥0.7% is satisfied, a microstructure including martensite and bainite containing retained austenite and bainitic ferrite, in which the proportion of martensite to the whole microstructure is 10% to 85% in terms of area fraction, in which tempered martensite constitutes 25% or more of martensite, in which the proportion of retained austenite is 5% to 40%, in which the proportion of bainitic ferrite among bainite to the whole microstructure is 5% or more in terms of area fraction, in which the sum of the proportions of martensite, retained austenite, and bainitic ferrite to the whole microstructure is 65% or more in terms of area fraction, and in which the average C content in retained austenite is 0.65% or more, a tensile strength TS of 980 MPa or more, and excellent ductility represented by a (TS×El) of 17000 MPa % or more.

CITATION LIST

Patent Literature

PTL 1: Japanese Unexamined Patent Application Publication No. 2013-79441

PTL 2: Japanese Unexamined Patent Application Publication No. 2010-65292

PTL 3: Japanese Unexamined Patent Application Publication No. 2010-65293

PTL 4: Japanese Unexamined Patent Application Publication No. 2010-65294

PTL 5: Japanese Unexamined Patent Application Publication No. 2010-65295

PTL 6: Japanese Unexamined Patent Application Publication No. 2010-174280

PTL 7: Japanese Unexamined Patent Application Publication No. 2010-174281

PTL 8: Japanese Unexamined Patent Application Publication No. 2010-174282

PTL 9: Japanese Unexamined Patent Application Publication No. 2010-174283

PTL 10: Japanese Unexamined Patent Application Publication No. 2011-184758

SUMMARY

Technical Problem

However, in the case of the technique described in Patent Literature 1, since it is necessary to increase the C content in the chemical composition in order to achieve high strength represented by a tensile strength TS of 1500 MPa or more, which is necessary for further decreasing the thickness of a part, there is a problem in that the uniform elongation is lower than that required, when seen from the viewpoint of achieving further excellent crashworthiness, and in particular, from the viewpoint of increasing impact-energy-absorbing capability.

Also, in the case of the techniques described in Patent Literature 2 through Patent Literature 9, since it is necessary to increase the C content in the chemical composition in order to achieve high strength represented by a tensile strength TS of 1500 MPa or more, there is a problem in that the uniform elongation is lower than that required, when seen from the viewpoint of increasing impact-energy-absorbing capability.

In addition, in the case of the technique described in Patent Literature 10, since large amounts of Si and Al are added in order to obtain a chemical composition in which the sum of the Si content and the Al content is increased to 0.7% or more, there is a problem of an increase in material costs. In addition, since the C content in the chemical composition is increased in order to achieve high strength represented by a tensile strength TS of 1500 MPa or more, which is necessary for further decreasing the thickness of a part, there is a problem in that the uniform elongation is lower than that required, when seen from the viewpoint of achieving excellent crashworthiness, and in particular, from the viewpoint of increasing impact-energy-absorbing capability.

An object of the disclosed embodiments is, by solving the related-art problems described above, to provide a high-strength hot-pressed part having high strength represented by a tensile strength TS of 1500 MPa or more and high uniform elongation represented by a uniform elongation uEl of 6.0% or more and a method for manufacturing the part.

Solution to Problem

The present inventors, in order to achieve the object described above, diligently conducted investigations regarding various factors influencing the uniform elongation of a hot-pressed part having high strength represented by a tensile strength TS of 1500 MPa or more, and, as a result, found that it is necessary to manufacture a hot-pressed part including an appropriate amount of retained austenite having excellent stability in order to achieve a high uniform elongation of 6.0% or more. In addition, it was first found that, in order to manufacture a high-strength hot-pressed part including retained austenite having excellent stability with the C content of less than 0.30 mass %, it is necessary to add at least 3.5 mass % or more of Mn. In addition, it was found that, since Mn contributes to increasing strength, it is possible to achieve further increased strength even in the case where the C content is less than 0.30 mass %.

In addition, it was newly found that, in order to form an appropriate amount of retained austenite having excellent stability in a high-strength hot-pressed part, it is necessary to use a cold-rolled steel sheet having the Mn content described above as a raw material for the hot-pressed part and to perform a heat treatment in which the steel sheet is heated and held in a dual-phase temperature range in which ferrite and austenite are formed for 100 seconds or more before hot pressing is performed so that the Mn content in austenite is increased. It was found that, with this, since it is possible to form an appropriate amount of retained austenite particularly having excellent stability in a part (hot-pressed part) after hot pressing has been performed, it is possible to obtain a hot-pressed part having high uniform elongation.

The disclosed embodiments have been completed on the basis of the knowledge described above and additional investigations. That is, the subject matter of the disclosed embodiments is as follows.

(1) A high-strength hot-pressed part obtained by performing a hot pressing process on a steel sheet, the part having a chemical composition containing, by mass %, C: 0.090% or more and less than 0.30%, Mn: 3.5% or more and less than 11.0%, Si: 0.01% to 2.5%, P: 0.05% or less, S: 0.05% or less, Al: 0.005% to 0.1%, N: 0.01% or less, and the balance being Fe and inevitable impurities, a microstructure including, in terms of volume fraction, 80% or more of a martensite phase, 3.0% to 20.0% of a retained austenite phase, and tensile properties represented by a tensile strength TS of 1500 MPa or more and a uniform elongation uEl of 6.0% or more.

(2) The high-strength hot-pressed part according to item (1), in which the chemical composition contains, by mass %, C: 0.090% or more and less than 0.12%, Mn: 4.5% or more and less than 6.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1500 MPa or more and less than 1700 MPa.

(3) The high-strength hot-pressed part according to item (1), in which the chemical composition contains, by mass %, C: 0.12% or more and less than 0.18%, Mn: 3.5% or more and less than 5.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1500 MPa or more and less than 1700 MPa.

(4) The high-strength hot-pressed part according to item (1), in which the chemical composition contains, by mass %, C: 0.090% or more and less than 0.12%, Mn: 6.5% or more and less than 8.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1700 MPa or more and less than 1900 MPa.

(5) The high-strength hot-pressed part according to item (1), in which the chemical composition contains, by mass %, C: 0.12% or more and less than 0.18%, Mn: 5.5% or more and less than 7.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1700 MPa or more and less than 1900 MPa.

(6) The high-strength hot-pressed part according to item (1), in which the chemical composition contains, by mass %, C: 0.18% or more and less than 0.30%, Mn: 3.5% or more and less than 4.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1800 MPa or more and less than 1980 MPa.

(7) The high-strength hot-pressed part according to item (1), in which the chemical composition contains, by mass %, C: 0.090% or more and less than 0.12%, Mn: 8.5% or more and 11.0% or less, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 2000 MPa or more and less than 2300 MPa.

(8) The high-strength hot-pressed part according to item (1), in which the chemical composition contains, by mass %, C: 0.12% or more and less than 0.18%, Mn: 7.5% or more and less than 11.0%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 2000 MPa or more and less than 2300 MPa.

(9) The high-strength hot-pressed part according to item (1), in which the chemical composition contains, by mass %, C: 0.18% or more and less than 0.30%, Mn: 4.5% or more and less than 6.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 2000 MPa or more and less than 2300 MPa.

(10) The high-strength hot-pressed part according to any one of items (1) to (9), the chemical composition further containing, by mass %, one, two, or more groups selected from among groups A through E below:

group A: one, two, or more selected from among Ni: 0.01% to 5.0%, Cu: 0.01% to 5.0%, Cr: 0.01% to 5.0%, and Mo: 0.01% to 3.0%, group B: one, two, or more selected from among Ti: 0.005% to 3.0%, Nb: 0.005% to 3.0%, V: 0.005% to 3.0%, and W: 0.005% to 3.0%, group C: one, two, or all of REM: 0.0005% to 0.01%, Ca: 0.0005% to 0.01%, and Mg: 0.0005% to 0.01%, group D: Sb: 0.002% to 0.03%, group E: B: 0.0005% to 0.05%.

(11) The high-strength hot-pressed part according to any one of items (1) to (10), having a coating layer on the surface of the high-strength hot-pressed part.

(12) The high-strength hot-pressed part according to item (11), the coating layer being a Zn-based coating layer or an Al-based coating layer.

(13) The high-strength hot-pressed part according to item (12), the Zn-based coating layer being a Zn—Ni-based coating layer containing Ni: 10 mass % to 25 mass %.

(14) A method for manufacturing a high-strength hot-pressed part, the method including performing a heating process and a hot press forming process on a raw material in order to obtain a hot-pressed part having a specified shape, in which the raw material is a steel sheet obtained by heating a cold-rolled steel sheet having a chemical composition containing, by mass %, C: 0.090% or more and less than 0.30%, Mn: 3.5% or more and less than 11.0%, Si: 0.01% to 2.5%, P: 0.05% or less, S: 0.05% or less, Al: 0.005% to 0.1%, N: 0.01% or less, and the balance being Fe and inevitable impurities to a temperature in a temperature range equal to or higher than the Ac1 transformation temperature and 850° C. or lower, by holding the heated steel sheet at the temperature for 100 seconds or more and 48 hours or less, then by cooling the held steel sheet, in which the heating process is a process in which the raw material is held at a temperature in a temperature range of 800° C. to 1000° C. for 600 seconds or less (including 0 seconds), in which the hot press forming process is a process in which the raw material heated in the heating process is subjected to press forming and quenching at the same time by using a forming tool, and in which the hot-pressed part has tensile properties represented by a tensile strength TS of 1500 MPa or more and a uniform elongation uEl of 6.0% or more.

(15) The method for manufacturing a high-strength hot-pressed part according to item (14), in which the chemical composition contains, by mass %, C: 0.090% or more and less than 0.12%, Mn: 4.5% or more and less than 6.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1500 MPa or more and less than 1700 MPa.

(16) The method for manufacturing a high-strength hot-pressed part according to item (14), in which the chemical composition contains, by mass %, C: 0.12% or more and less than 0.18%, Mn: 3.5% or more and less than 5.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1500 MPa or more and less than 1700 MPa.

(17) The method for manufacturing a high-strength hot-pressed part according to item (14), in which the chemical composition contains, by mass %, C: 0.090% or more and less than 0.12%, Mn: 6.5% or more and less than 8.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1700 MPa or more and less than 1900 MPa.

(18) The method for manufacturing a high-strength hot-pressed part according to item (14), in which the chemical composition contains, by mass %, C: 0.12% or more and less than 0.18%, Mn: 5.5% or more and less than 7.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1700 MPa or more and less than 1900 MPa.

(19) The method for manufacturing a high-strength hot-pressed part according to item (14), in which the chemical composition contains, by mass %, C: 0.18% or more and less than 0.30%, Mn: 3.5% or more and less than 4.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 1800 MPa or more and less than 1980 MPa.

(20) The method for manufacturing a high-strength hot-pressed part according to item (14), in which the chemical composition contains, by mass %, C: 0.090% or more and less than 0.12%, Mn: 8.5% or more and 11.0% or less, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 2000 MPa or more and less than 2300 MPa.

(21) The method for manufacturing a high-strength hot-pressed part according to item (14), in which the chemical composition contains, by mass %, C: 0.12% or more and less than 0.18%, Mn: 7.5% or more and less than 11.0%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 2000 MPa or more and less than 2300 MPa.

(22) The method for manufacturing a high-strength hot-pressed part according to item (14), in which the chemical composition contains, by mass %, C: 0.18% or more and less than 0.30%, Mn: 4.5% or more and less than 6.5%, Si: 0.01% to 2.5%, P: 0.05% or less, S: 0.05% or less, Al: 0.005% to 0.1%, N: 0.01% or less, and the balance being Fe and inevitable impurities, and in which the tensile strength TS is 2000 MPa or more and less than 2300 MPa.

(23) The method for manufacturing a high-strength hot-pressed part according to any one of items (14) to (22), the chemical composition of the cold-rolled steel sheet further containing, by mass %, one, two, or more groups selected from among groups A through E below:

group A: one, two, or more selected from among Ni: 0.01% to 5.0%, Cu: 0.01% to 5.0%, Cr: 0.01% to 5.0%, and Mo: 0.01% to 3.0%, group B: one, two, or more selected from among Ti: 0.005% to 3.0%, Nb: 0.005% to 3.0%, V: 0.005% to 3.0%, and W: 0.005% to 3.0%, group C: one, two, or all of REM: 0.0005% to 0.01%, Ca: 0.0005% to 0.01%, and Mg: 0.0005% to 0.01%, group D: Sb: 0.002% to 0.03%, group E: B: 0.0005% to 0.05%.

(24) The method for manufacturing a high-strength hot-pressed part according to any one of items (14) to (23), the method further including forming a coating layer on the surface of the cold-rolled steel sheet.

(25) The method for manufacturing a high-strength hot-pressed part according to item (24), the coating layer being a Zn-based coating layer or an Al-based coating layer.

(26) The method for manufacturing a high-strength hot-pressed part according to item (25), the Zn-based coating layer being a Zn—Ni-based coating layer containing Ni: 10 mass % to 25 mass %.

(27) The method for manufacturing a high-strength hot-pressed part according to any one of items (24) to (26), the coating layer having a coating weight of 10 $g/m^2$ to 90 $g/m^2$ per side.

Advantageous Effects

According to the disclosed embodiments, it is possible to obtain a high-strength hot-pressed part having a tensile strength TS of 1500 MPa or more, or preferably less than 2300 MPa, and a high uniform elongation of 6.0% or more which can preferably be used for automotive parts with ease and at low cost, which has a marked effect on the industry. In addition, the high-strength hot-pressed part according to the disclosed embodiments can preferably be used as structural parts such as the impact beams, center pillars, and bumpers of automobile bodies which are required to have high energy-absorbing capability at the time of a collision. By using the high-strength hot-pressed part according to the disclosed embodiments, it is possible to further decrease the thickness of a part in response to a demand for the further reduction of the weight of automobile bodies, which is effective for contributing to global environment conservation.

DETAILED DESCRIPTION

The high-strength hot-pressed part according to the disclosed embodiments is a hot-pressed part, which is formed by performing a hot pressing process on a steel sheet, and has a chemical composition containing, by mass %, C: 0.090% or more and less than 0.30%, Mn: 3.5% or more and less than 11.0%, Si: 0.01% to 2.5%, P: 0.05% or less, S: 0.05% or less, Al: 0.005% to 0.1%, N: 0.01% or less, and the balance being Fe and inevitable impurities. The chemical composition described above is the basic chemical composition in the disclosed embodiments. First, the reasons for limitations on the basic chemical composition will be described. Hereinafter, mass % is simply referred to as %, unless otherwise noted.

C: 0.090% or more and less than 0.30%

C is a chemical element which increases the strength of steel, and, in order to achieve high strength represented by a tensile strength TS of 1500 MPa or more for a hot-pressed part by realizing such an effect, it is necessary that the C content be 0.090% or more. On the other hand, in the case where the C content is 0.30% or more, since there is an increase in the amount of solid-solution strengthening due to C, it is difficult to control the tensile strength TS of a hot-pressed part to be less than 2300 MPa.

Mn: 3.5% or more and less than 11.0%

Since Mn is a chemical element which increases the strength of steel and which increases the stability of austenite as a result of being concentrated into austenite, Mn is the most important chemical element in the disclosed embodiments. In order to achieve a tensile strength TS of 1500 MPa or more and a uniform elongation uEl of 6.0% or more for a hot-pressed part by realizing such effects, it is necessary that the Mn content be 3.5% or more. On the other hand, in the case where the Mn content is 11.0% or more, since there is an increase in the amount of solid-solution strengthening due to Mn, it is difficult to control the tensile strength TS of a hot-pressed part to be less than 2300 MPa.

In the case where the C and the Mn content are within the ranges described above, it is possible to obtain a hot-pressed part having tensile properties with which it is possible to stably achieve a uniform elongation of 6.0% or more while achieving a tensile strength TS of 1500 MPa or more, or preferably less than 2300 MPa. Here, in more detail, in order to achieve strength represented by a tensile strength TS of 1500 MPa or more and less than 1700 MPa, it is preferable that the chemical composition contain C: 0.090% or more and less than 0.12% and Mn: 4.5% or more and less than 6.5% or that the chemical composition contain C: 0.12% or more and less than 0.18% and Mn: 3.5% or more and less than 5.5%. In addition, in order to achieve strength represented by a tensile strength TS of 1700 MPa or more and less than 1900 MPa, it is preferable that the chemical composition contain C: 0.090% or more and less than 0.12% and Mn: 6.5% or more and less than 8.5% or that the chemical composition contain C: 0.12% or more and less than 0.18% and Mn: 5.5% or more and less than 7.5%. In addition, in order to achieve strength represented by a tensile strength TS of 1800 MPa or more and less than 1980 MPa, it is preferable that the chemical composition contain C: 0.18% or more and less than 0.30% and Mn: 3.5% or more and less than 4.5%. In addition, in order to achieve strength represented by a tensile strength TS of 2000 MPa or more and less than 2300 MPa, it is preferable that the chemical composition contain C: 0.090% or more and less than 0.12% and Mn: 8.5% to 11.0%, that the chemical composition contain C: 0.12% or more and less than 0.18% and Mn: 7.5% or more and less than 11.0%, or that the chemical composition contain C: 0.18% or more and less than 0.30% and Mn: 4.5% or more and less than 6.5%.

In the disclosed embodiments, the chemical composition further contains Si: 0.01% to 2.5%, P: 0.05% or less, S: 0.05% or less, Al: 0.005% to 0.1%, and N: 0.01% or less in addition to C and Mn described above.

Si: 0.01% to 2.5%

Si is a chemical element which increases the strength of steel through solid-solution strengthening, and, in order to realize such an effect, it is necessary that the Si content be 0.01% or more. On the other hand, in the case where the Si content is more than 2.5%, there is a significant increase in the amount of a surface defect, which is called red scale, when hot rolling is performed and there is an increase in rolling load. Therefore, the Si content is limited to the range of 0.01% to 2.5%, or preferably 0.02% to 1.5%. Here, in the case where Si is inevitably contained, the Si content is less than about 0.01%.

P: 0.05% or less

Since P is a chemical element which is present in steel as an inevitable impurity and which has a negative effect of, for example, decreasing the toughness of a part as a result of being segregated, for example, at grain boundaries, it is preferable that the P content be as small as possible. In the disclosed embodiments, since it is acceptable that the P content be 0.05% or less, the P content is limited to be 0.05% or less, or preferably 0.02% or less. In addition, since there is an increase in refining costs in the case where dephosphorization is excessively performed, it is preferable that the P content be 0.0005% or more.

S: 0.05% or less

S is contained as an inevitable impurity and decreases, for example, the ductility and toughness of a hot-pressed part as a result of being present in steel in the form of sulfide-based inclusions. Therefore, it is preferable that the S content be as small as possible. In the disclosed embodiments, since it is acceptable that the S content be 0.05% or less, the S content is limited to be 0.05% or less, or preferably 0.005% or less. In addition, since there is an increase in refining costs in the case where desulfurization is excessively performed, it is preferable that the S content be 0.0005% or more.

Al: 0.005% to 0.1%

Al is a chemical element which functions as a deoxidizing agent, and, in order to realize such an effect, it is necessary that the Al content be 0.005% or more. On the other hand, in the case where the Al content is more than 0.1%, since Al combines with nitrogen to form a large number of nitrides, there is a decrease in the blanking workability and hardenability of a steel sheet as a raw material. Therefore, the Al content is limited to the range of 0.005% to 0.1%, or preferably 0.02% to 0.05%. Here, in the case where Al is not intentionally added, that is, in the case of the Al content at an impurity level, the Al content is less than about 0.0010%.

N: 0.01% or less

Usually, N is inevitably contained in steel. However, in the case where the N content is more than 0.01%, since nitrides such as AlN is formed in a heating process for hot rolling and hot pressing, there is a decrease in the blanking workability and hardenability of a steel sheet as a raw material. Therefore, the N content is limited to be 0.01% or less, or preferably 0.002% to 0.005%. In addition, in the case where the N content is intentionally controlled and where N is inevitably contained, the N content is about 0.0010% or less.

Also, in addition to the basic chemical composition described above, in the disclosed embodiments, the chemical composition may contain one, two, or more groups selected from among groups A through E below:

group A: one, two, or more selected from among Ni: 0.01% to 5.0%, Cu: 0.01% to 5.0%, Cr: 0.01% to 5.0%, and Mo: 0.01% to 3.0%, group B: one, two, or more selected from among Ti: 0.005% to 3.0%, Nb: 0.005% to 3.0%, V: 0.005% to 3.0%, and W: 0.005% to 3.0%, group C: one, two, or all of REM: 0.0005% to 0.01%, Ca: 0.0005% to 0.01%, and Mg: 0.0005% to 0.01%, group D: Sb: 0.002% to 0.03%, group E: B: 0.0005% to 0.05%.

Group A: one, two, or more selected from among Ni: 0.01% to 5.0%, Cu: 0.01% to 5.0%, Cr: 0.01% to 5.0%, and Mo: 0.01% to 3.0%

Since any one of Ni, Cu, Cr, and Mo in group A is a chemical element which increases the strength of steel and which contributes to increasing hardenability, one, two, or more selected from among these chemical elements may be added as needed.

Ni contributes to increasing the strength and hardenability of steel. In order to realize such effects, it is preferable that the Ni content be 0.01% or more. On the other hand, in the case where the Ni content is more than 5.0%, there is a significant increase in material costs. Therefore, in the case where Ni is added, it is preferable that the Ni content be limited to the range of 0.01% to 5.0%, or more preferably 0.01% to 1.0%.

Cu, like Ni, effectively contributes to increasing the strength and hardenability of steel. In order to realize such effects, it is preferable that the Cu content be 0.01% or more. On the other hand, in the case where the Cu content is more than 5.0%, there is a significant increase in material costs. Therefore, in the case where Cu is added, it is preferable that the Cu content be limited to the range of 0.01% to 5.0%, or more preferably 0.01% to 1.0%.

Cr, like Ni and Cu, effectively contributes to increasing the strength and hardenability of steel. In order to realize such effects, it is preferable that the Cr content be 0.01% or more. On the other hand, in the case where the Cr content is more than 5.0%, there is a significant increase in material costs. Therefore, in the case where Cr is added, it is preferable that the Cr content be limited to the range of 0.01% to 5.0%, or more preferably 0.01% to 1.0%.

Mo, like Cr, Cu, and Ni, effectively contributes to increasing the strength and hardenability of steel. In order to realize such effects, it is preferable that the Mo content be 0.01% or more. On the other hand, in the case where the Mo content is more than 3.0%, there is a significant increase in material costs. Therefore, in the case where Mo is added, it is preferable that the Mo content be limited to the range of 0.01% to 3.0%, or more preferably 0.01% to 1.0%.

Group B: one, two, or more selected from among Ti: 0.005% to 3.0%, Nb: 0.005% to 3.0%, V: 0.005% to 3.0%, and W: 0.005% to 3.0%

Since any one of Ti, Nb, V, and W in group B is a chemical element which contributes to increasing the strength of steel through precipitation strengthening and which contributes to increasing toughness by decreasing crystal grain diameter, one, two, or more selected from among these chemical elements may be added as needed.

Ti contributes to increasing the strength of steel through precipitation strengthening and to an increase in toughness by decreasing crystal grain diameter. In addition, since Ti more readily forms nitrides than B does, Ti effectively contributes to realizing the effect of increasing hardenability through the use of a solid solution B. In order to realize such effects, it is necessary that the Ti content be 0.005% or more. On the other hand, in the case where the Ti content is more than 3.0%, there is a significant increase in rolling load when hot rolling is performed, and there is a decrease in the toughness of a hot-pressed part. Therefore, in the case where Ti is added, it is preferable that the Ti content be limited to the range of 0.005% to 3.0%, or more preferably 0.01% to 1.0%.

Nb, like Ti, contributes to increasing the strength of steel through precipitation strengthening and to an increase in toughness by decreasing grain diameter. In order to realize such an effect, it is necessary that the Nb content be 0.005% or more. On the other hand, in the case where the Nb content is more than 3.0%, since there is an increase in the amount of carbonitrides, there is a decrease in ductility and delayed fracturing resistance. Therefore, in the case where Nb is added, it is preferable that the Nb content be limited to the range of 0.005% to 3.0%, or more preferably 0.01% to 0.05%.

V, like Ti and Nb, contributes to increasing the strength of steel through precipitation strengthening and to an increase in toughness by decreasing grain diameter. In addition, V increases hydrogen brittleness resistance by functioning as hydrogen-trapping sites as a result of being precipitated in the form of precipitates and crystallized matter. In order to realize such effects, it is necessary that the V content be 0.005% or more. On the other hand, in the case where the V content is more than 3.0%, since there is a significant increase in the amount of carbonitrides, there is a significant decrease in ductility. Therefore, in the case where V is added, it is preferable that the V content be limited to the range of 0.005% to 3.0%, or more preferably 0.01% to 2.0%.

W, like V, Ti, and Nb, effectively contribute to an increase in strength, an increase in toughness, and an increase in hydrogen brittleness resistance. In order to realize such effects, it is necessary that the W content be 0.005% or more. On the other hand, in the case where the W content is more than 3.0%, there is a significant decrease in ductility. Therefore, in the case where W is added, it is preferable that the W content be limited to the range of 0.005% to 3.0%, or more preferably 0.01% to 2.0%.

Group C: one, two, or all of REM: 0.0005% to 0.01%, Ca: 0.0005% to 0.01%, and Mg: 0.0005% to 0.01%

Since any one of REM, Ca, and Mg in group C is a chemical element which effectively contributes to the shape control of inclusions, one, two, or all of these chemical elements may be added as needed.

REM contributes to increasing ductility and hydrogen brittleness resistance through the shape control of inclusions. In order to realize such an effect, it is necessary that the REM content be 0.0005% or more. On the other hand, in the case where the REM content is more than 0.01%, there is a decrease in hot workability. Therefore, in the case where REM is added, it is preferable that the REM content be limited to the range of 0.0005% to 0.01%, or more preferably 0.0006% to 0.01%.

Ca, like REM, contributes to increasing ductility and hydrogen brittleness resistance through the shape control of inclusions. In order to realize such an effect, it is necessary that the Ca content be 0.0005% or more. On the other hand, in the case where the Ca content is more than 0.01%, there is a decrease in hot workability. Therefore, in the case where Ca is added, it is preferable that the Ca content be limited to the range of 0.0005% to 0.01%, or more preferably 0.0006% to 0.01%.

Mg, like Ca and REM, contributes to increasing ductility through the shape control of inclusions and to increasing hydrogen brittleness resistance by combining with other chemical elements to form compound precipitates and compound crystallized matter. In order to realize such effects, it is necessary that the Mg content be 0.0005% or more. On the other hand, in the case where the Mg content is more than 0.01%, since oxides and sulfides having a large grain diameter are formed, there is a decrease in ductility. Therefore, in the case where Mg is added, it is preferable that the Mg content be limited to the range of 0.0005% to 0.01%, or more preferably 0.0006% to 0.01%.

Group D: Sb: 0.002% to 0.03%

Since Sb in group D is a chemical element which has a function of inhibiting the formation of a decarburized layer in the surface layer of a steel sheet when a steel sheet is heated or cooled, Sb may be added as needed. In order to realize such an effect, it is necessary that the Sb content be 0.002% or more. On the other hand, in the case where the Sb content is more than 0.03%, since there is an increase in rolling load, there is a decrease in productivity. Therefore, in the case where Sb is added, it is preferable that the Sb content be limited to the range of 0.002% to 0.03%, or more preferably 0.002% to 0.02%.

Group E: B: 0.0005% to 0.05%

Since B in group E is a chemical element which effectively contributes to increasing hardenability when hot pressing is performed and to increasing toughness after hot pressing has been performed, B may be added as needed. In order to realize such effects, it is necessary that the B content be 0.0005% or more. On the other hand, in the case where the B content is more than 0.05%, there is an increase in rolling load when hot rolling is performed, and there is a case where, since a martensite phase and a bainite phase are formed after hot rolling has been performed, for example, cracking occurs in a steel sheet. Therefore, in the case where B is added, it is preferable that the B content be limited to the range of 0.0005% to 0.05%, or more preferably 0.0005% to 0.01%.

The remainder which is different from the chemical elements described above is Fe and inevitable impurities. Here, among inevitable impurities, it is acceptable that the O (oxygen) content be 0.0100% or less.

Moreover, the high-strength hot-pressed part according to the disclosed embodiments has the chemical composition described above and a microstructure including, in terms of volume fraction, 80% or more of a martensite phase and 3.0% to 20.0% of a retained austenite phase. Here, regarding the remainder which is different from a martensite phase and a retained austenite phase, it is acceptable that the total volume fraction of a bainite phase, a ferrite phase, cementite, and pearlite be 10% or less (including 0%).

Martensite phase: 80% or more in terms of volume fraction

In order to achieve a tensile strength TS of 1500 MPa or more, it is necessary that, in terms of volume fraction, 80% or more of a martensite phase be included as a main phase. In the case where the volume fraction of a martensite phase is less than 80%, it is not possible to achieve the desired high strength described above. Here, it is preferable that the volume fraction of a martensite phase be 97% or less at most so that the desired amount of a retained austenite phase is included.

Retained austenite phase: 3.0% to 20.0% in terms of volume fraction

A retained austenite phase is the most important microstructure in the disclosed embodiments in order to increase uniform elongation through the use of a TRIP effect (transformation-induced plasticity) in a deformation process. In the disclosed embodiments, in terms of volume fraction, 3.0% to 20.0% of a retained austenite phase is included. Uniform elongation increases with an increase in the volume fraction of a retained austenite phase. In the case where the volume fraction of a retained austenite phase is less than 3.0%, it is not possible to achieve a uniform elongation uEl of 6.0% or more. On the other hand, in the case where the volume fraction of a retained austenite phase is more than 20.0%, since there is an excessive increase in the amount of a hard martensite phase which is formed through transformation after a TRIP effect has been realized, there is a decrease in toughness. Therefore, the volume fraction of a retained austenite phase is limited to the range of 3.0% to 20.0%, or preferably 5.0% to 18.0%.

Here, in order to form a stable retained austenite phase with which a TRIP effect (transformation-induced plasticity) is effectively realized, it is important to use a steel sheet (raw material) having a chemical composition containing an appropriate amount of Mn, to perform a pre-treatment for concentrating Mn into an austenite on the raw material before hot pressing is performed, and to optimize, for example, a heating process when hot pressing is performed.

It is preferable that the high-strength hot-pressed part according to the disclosed embodiments having the chemical composition and the microstructure described above have a coating layer on the surface thereof.

In the case where a steel sheet which is used as a raw material for a hot-pressed part is a coated steel sheet, the obtained hot-pressed part has a coating layer retained on the surface layer thereof. In the case where a hot-pressed part has a coating layer on the surface thereof, since it is possible to use the part without performing descaling on the surface of the part, there is an increase in productivity in a hot pressing process. This is because the generation of scale is inhibited in a heating process of hot pressing in the case where a coated steel sheet is used as a raw material for a hot-pressed part.

Here, it is preferable that the coating layer be a Zn-based coating layer or an Al-based coating layer. In the case of a part which is required to have sufficient corrosion resistance, a Zn-based coating layer is better than an Al-based coating layer. This is because it is possible to decrease the corrosion rate of the base steel due to the sacrificial anticorrosive effect of Zinc Zn. Here, examples of a Zn-based coating layer include a general galvanizing layer, a galvannealing layer, and a Zn—Ni-based coating layer. In particular, it is preferable to use a Zn—Ni-based coating layer having a Ni content of 10 mass % to 25 mass %. By using a Zn—Ni-based coating layer, it is possible to significantly inhibit the generation of scale in a heating process of a hot pressing process, and it is possible to prevent cracking due to liquid-metal embrittlement. It is known that cracking due to liquid-metal embrittlement is a phenomenon in which, when hot pressing is performed, Zn which has been melted in a heating process promotes the cracking of the base steel due to strain provided in a forming process. In the case where the Ni content in a Zn-based coating layer is 10% or more, since there is a rise in the melting point of the Zn-based coating layer, it is possible to prevent cracking due to liquid-metal embrittlement described above. In addition, in the case where the Ni content is more than 25%, such an effect becomes saturated.

In addition, examples of an Al-based coating layer include an Al-10-mass %-Si coating layer.

Here, since a zinc-based coating layer existing in the surface layer of a hot-pressed part forms a zinc oxide film in the early stage of a heating process of a hot pressing process, there is also an effect of preventing Zn from vaporizing in subsequent processes in which the hot-pressed part is treated.

Hereafter, the method for manufacturing the high-strength hot-pressed part according to the disclosed embodiments will be described.

It is preferable that molten steel having the chemical composition described above be prepared by using a known method such as one using a converter and that the molten steel be cast into a slab (steel raw material) by using a continuous casting method in order to prevent macro segregation. Here, there is no problem with using an ingot-making method or a thin-slab continuous casting method instead of a continuous casting method. In addition, the obtained slab is first cooled to room temperature and then charged into a heating furnace so as to be reheated.

Here, in the disclosed embodiments, there is no problem with using an energy-saving process, in which the slab is not cooled to room temperature, such as one in which the slab is charged into a heating furnace in the hot-piece state or a hot direct rolling method in which the slab is directly subjected hot rolling immediately after a heat retention treatment has been performed for a short time.

The obtained slab is heated to a specified heating temperature and then subjected to a hot rolling process so as to be made into a hot-rolled steel sheet. Here, examples of the specified heating temperature include a temperature of 1000° C. to 1300° C. The slab, which has been heated to the specified heating temperature as described above, is usually subjected to hot rolling in which a temperature at the entrance of finish rolling is 1100° C. or lower and a temperature at the exit of finish rolling is 800° C. to 950° C., then subjected to cooling at an average cooling rate of 5° C./s or more, and then wound in a coiled shape at a coiling temperature of 300° C. to 750° C. in order to obtain a hot-rolled steel sheet.

The obtained hot-rolled steel sheet is subjected to pickling and cold rolling in order to obtain a cold-rolled steel sheet. Here, it is preferable that the rolling reduction of cold rolling be 30% or more, or more preferably 50% or more, in order to prevent crystal grains from abnormally growing in a heating process before hot pressing or in a subsequent annealing process. In addition, it is preferable that the rolling reduction be 85% or less, because rolling load increases and productivity decreases with an increase in rolling reduction. In addition, in the case where there is a significant increase in rolling load, softening annealing may be performed on the hot-rolled steel sheet before a cold rolling process. It is preferable that softening annealing be performed by using, for example, a batch annealing furnace or a continuous annealing furnace.

In the case of the method for manufacturing the high-strength hot-pressed part according to the disclosed embodiments, a cold-rolled steel sheet is used as a raw material. Here, the reason why a cold-rolled steel sheet is used is because it is easy to obtain a thin steel sheet and because it is possible to achieve high thickness accuracy.

In the case of the method for manufacturing the high-strength hot-pressed part according to the disclosed embodiments, the raw material is subjected to a heating process and a hot press forming process in order to obtain a hot-pressed part having a specified shape.

The raw material used in the disclosed embodiments is a cold-rolled steel sheet which has the chemical composition described above and which has been subjected to a treatment for concentrating Mn into austenite. A treatment for concentrating Mn in to austenite is a treatment in which the cold-rolled steel sheet is heated to a temperature in a temperature range equal to or higher than the Ac1 transformation temperature and 850° C. or lower, then held at the temperature for 100 seconds or more and 48 hours or less, and then cooled.

Subsequently, the cold-rolled steel sheet having the chemical composition described above is subjected to a treatment in which the cold-rolled steel sheet is heated to a temperature in a temperature range equal to or higher than the Ac1 transformation temperature and 850° C. or lower, then held at the temperature for 100 seconds or more and 48 hours or less, and then cooled. This treatment is a process which is the most important for achieving the uniform elongation desired for a hot-pressed part in the disclosed embodiments.

Heating temperature: equal to or higher than the Ac1 transformation temperature and 850° C. or lower In the disclosed embodiments, by heating a cold-rolled steel sheet to a dual-phase temperature range, Mn is concentrated into austenite. In austenite into which Mn is concentrated, since a temperature at which martensite transformation is finished is equal to or lower than room temperature, retained austenite tends to be formed. In the case where the heating temperature is lower than the Ac1 transformation temperature, since austenite is not formed, it is not possible to concentrate Mn into austenite. On the other hand, in the case where the heating temperature is higher than 850° C., since the temperature is a temperature range in which an austenite single phase is formed, it is not possible to concentrate Mn into austenite. Therefore, the heating temperature is limited to be equal to or higher than the Ac1 transformation temperature and 850° C. or lower, or preferably (the Ac1 transformation temperature+20° C.) to 700° C.

Here, the Ac1 transformation temperature (° C.) is defined as a value calculated by equation below.

Ac1 transformation temperature (° C.)=751−16C+11Si−28Mn−5.5Cu−16Ni+13Cr+3.4 Mo (where C, Si, Mn, Ni, Cu, Cr, and Mo respectively denote the content (mass %) of the corresponding chemical elements)

When calculating the Ac1 transformation temperature, in the case where one of the chemical elements involved in the equation above is not contained, calculation is performed on the assumption that the content of the chemical element is zero.

Heating-temperature holding time: 100 seconds or more and 48 hours or less

Concentration of Mn into austenite progresses as heating-temperature holding time proceeds. In the case where the heating-temperature holding time is less than 100 seconds, since insufficient Mn concentration into austenite occurs, it is not possible to achieve the desired uniform elongation. On the other hand, in the case where the heating-temperature holding time is more than 48 hours, since pearlite is formed, it is not possible to achieve the desired uniform elongation. Therefore, the heating-temperature holding time is limited to the range of 100 seconds or more and 48 hours or less, or preferably 1 hour to 24 hours.

It is more preferable that the heating-temperature holding time be 2.5 hours to 20 hours. This is because, in the case where the heating-temperature holding time is within this range, since sufficient Mn concentration into austenite occurs, there is an increase in the degree of the stability of retained austenite. With this, since it is possible to form, in terms of volume fraction, 10% or more of retained austenite, it is possible to achieve 9.5% or more of uniform elongation.

Here, it is not necessary to put a particular limitation on cooling after heating-temperature holding time described above, and it is preferable that, for example, radiation cooling (slow cooling) or controlled cooling be appropriately performed, for example, in accordance with a heating furnace used.

It is preferable that the treatment for concentrating Mn into austenite described above be performed by using a batch annealing furnace or a continuous annealing furnace. There is no particular limitation on what conditions other than that regarding heating and holding described above are used for a treatment using a batch annealing furnace. In the disclosed embodiments, for example, from the viewpoint of Mn concentration, it is preferable that a heating rate be 40° C./h or more and that a cooling rate after heating-temperature holding time be 40° C./h or more. In addition, it is not necessary to put a particular limitation on what conditions other than that regarding heating and holding described above are used for a treatment using a continuous annealing furnace. In the disclosed embodiments, for example, after the heating-temperature holding time described above, it is preferable, from the viewpoint of manufacturability, to perform a treatment in which the held steel sheet is cooled at an average cooling rate of 10° C./s or more to a cooling stop temperature in a temperature range of 350° C. to 600° C., subsequently held at a temperature of 350° C. to 600° C. for 10 seconds to 300 seconds, then cooled, and then coiled.

In the disclosed embodiments, a cold-rolled steel sheet which is used as a raw material may be any one of non-coated steel sheet and coated steel sheet. In the case of a non-coated steel sheet, it is necessary that, after a hot pressing process, the hot-pressed part be subjected to a descaling treatment such as shot blasting. On the other hand, in the case of a coated steel sheet, since the generation of scale is inhibited in a heating process of a hot pressing process, it is not necessary that the hot-pressed part after hot pressing be subjected to a descaling treatment such as shot blasting, which results in an increase in productivity in the hot pressing process.

In the case where a coated cold-rolled steel sheet is used as a raw material, it is preferable that the raw material be a coated cold-rolled steel sheet having a coating layer having a coating weight of 10 g/m² to 90 g/m² per side. In the case where the coating weight is less than 10 g/m², there is an insufficient effect of inhibiting the generation of scale in a heating process. On the other hand, in the case where the coating weight is more than 90 g/m², since the coating material adheres to rolls when the coated steel sheet is manufactured, there is a decrease in manufacturability. Therefore, it is preferable that the coating weight be limited to the range of 10 g/m² to 90 g/m², or more preferably 30 g/m² to 70 g/m² per side.

Examples of a coating layer used in order to inhibit the generation of scale include zinc-based coating layer such as a general galvanizing layer (GI) and a galvannealing layer (GA) and an aluminum-based coating layer. Here, in the case of a part which is required to have sufficient corrosion resistance, a zinc-based coating layer is better than an aluminum-based coating layer. This is because it is possible to decrease the corrosion rate of the base steel through the use of the sacrificial anticorrosive effect of zinc.

In addition, it is preferable that the zinc-based coating layer be a Zn—Ni-based coating layer having a Ni content of 10 mass % to 25 mass %. By using a Zn—Ni-based coating layer as a coating layer formed on the surface of a steel sheet, it is possible to inhibit the generation of scale in a heating process of hot pressing, and it is possible to prevent cracking due to liquid-metal embrittlement. It is known that cracking due to liquid-metal embrittlement is a phenomenon in which, when hot pressing is performed, Zn which has been melted in a heating process promotes the cracking of the base steel due to strain provided in a forming process. In the case where the Ni content in a Zn-based coating layer is 10% or more, since there is a rise in the melting point of the Zn-based coating layer, it is possible to prevent cracking due to liquid-metal embrittlement described above. In addition, in the case where the Ni content is more than 25%, such an effect becomes saturated.

Subsequently, the raw material which has been subjected to treatments described above is subjected to a heating process and a hot press forming process in order to obtain a hot-pressed part having a specified shape.

The heating process is a process in which the raw material is held at a temperature in a temperature range of 800° C. to 1000° C. for 600 seconds or less (including 0 seconds).

In the heating process, the raw material is heated in a temperature range in which an austenite single phase is formed. Therefore, the heating temperature is limited to be 800° C. or higher. In the case where the heating temperature is lower than 800° C., since an insufficient amount of austenite is formed, it is not possible to form the desired amount of martensite in microstructure of a part after hot pressing, which makes it impossible to achieve the desired tensile strength. On the other hand, in the case where the heating temperature is higher than 1000° C., since Mn which has been concentrated into austenite through the pre-treatment on the raw material is uniformly redistributed, it is not possible to achieve the desired amount of retained austenite, which makes it impossible to achieve the desired uniform elongation. Therefore, in the heating process, the heating temperature is limited to the range of 800° C. to 1000° C., or preferably 800° C. to 950° C.

Here, it is not necessary to put a particular limitation on a heating rate up to the heating temperature. In the disclosed embodiments, it is preferable that the heating rate be 1° C./s to 400° C./s. In the case where the heating rate is less than 1° C./s, there is a decrease in productivity. On the other hand, in the case where the heating rate is more than 400° C./s, there is a case where temperature control is unstable. Here, it is more preferable that 10° C./s to 150° C./s.

In addition, the holding time at the heating temperature described above is limited to be 600 seconds or less (including 0 seconds).

As the holding time at the heating temperature proceeds, the concentrated Mn is diffused to the surrounding area so as to be uniformly distributed. Therefore, in the case where the holding time is more than 600 seconds, it is not possible to achieve the desired amount of retained austenite. Therefore, the holding time at the heating temperature described above is limited to be 600 seconds or less (including 0 seconds). Here, the term "a holding time of 0 seconds" refers to a case where heating is finished immediately after the heating temperature reaches the target.

Here, there is no limitation on what method is used for heating the raw material, and any one of general heating methods such as one using an electric furnace or a gas furnace, an infrared heating method, a high-frequency heating method, and a direct energization heating method. In addition, it is not necessary to put a particular limitation on the atmosphere, any kind of atmosphere such as atmospheric air or an inert gas may be used.

In addition, the hot press forming process is a process in which the raw material which has been heated in the heating process is subjected to press forming and quenching at the same time by using a forming tool.

In the heating process, the raw material, which has been heated in a temperature range in which an austenite single phase is formed, is transported to a pressing machine and then formed into a hot-pressed part having a specified (dimensional) shape and subjected to quenching at the same time by performing press forming using a forming tool in the pressing machine. With this, the hot-pressed part has a microstructure including mainly a hard martensite phase so as to be a hot-pressed part having a high tensile strength.

Here, it is not necessary to put a particular limitation on a press-forming start temperature (pressing temperature) in the pressing machine. In the disclosed embodiments, it is preferable that the pressing temperature be 500° C. or higher. In the case where the press-forming start temperature is lower than 500° C., since there is an increase in forming load, there is an increase in load placed on the pressing machine. Therefore, it is preferable that the press-forming start temperature be 500° C. or higher, or more preferably 650° C. or higher. The upper limit of the press-forming start temperature is the heating and holding temperature in the manufacturing process. Here, in a transporting process before forming is started, air cooling is generally performed. However, in the case where there is an increase in cooling rate due to a coolant such as a gas or a liquid, it is preferable that the cooling rate be decreased by using a heat-retaining device such as a heat-retaining box.

In addition, it is not necessary to put a particular limitation on a cooling rate in the forming tool. In the disclosed embodiments, it is preferable that an average cooling rate down to a temperature of 200° C. be 20° C./s or more. In the case where the average cooling rate down to a temperature of 200° C. is less than 20° C./s, since there is an increase in cooling time in the forming tool, there is a decrease in productivity in the hot pressing process. Therefore, it is preferable that the cooling rate in the forming tool be limited to 20° C./s or more, or more preferably 40° C./s or more, in terms of average cooling rate down to a temperature of 200° C.

In addition, it is not necessary to put a particular limitation on time at which the hot-pressed part is removed from the forming tool or a cooling rate after the hot-pressed part has been removed from the forming tool. Here, examples of a cooling method include one in which a punching tool is held at the bottom dead point for 1 second to 60 seconds in order to cool the hot-pressed part by using a die tool and the punching tool. Subsequently, the hot-pressed part is removed from the forming tool and cooled. Cooling in the forming tool and after the hot-pressed part has been removed from the forming tool may be performed by using cooling methods respectively using coolants such as a gas and a liquid in combination so that there is an increase in productivity.

EXAMPLES

After having prepared molten steel having the chemical compositions given in Tables 1-1 and 1-2 by using a small vacuum melting furnace in order to obtain small steel ingots (50 kgf), the ingots were subjected to slabbing rolling, rough rolling and finish rolling. In the finish rolling process, heating was performed at a temperature of 1100° C. to 1300° C., and then hot rolling was performed with a finishing rolling delivery temperature of 800° C. to 950° C. in order to obtain hot-rolled steel sheets. Here, a cooling rate after having finished hot rolling was 5° C./s to 200° C./s in terms of average cooling rate from 800° C. to 600° C., and a coiling temperature was 500° C. to 650° C. The obtained hot-rolled steel sheets were further subjected to pickling and cold rolling with a rolling reduction of cold rolling of 45% to 70% in order to obtain cold-rolled steel sheets (having a thickness of 1.6 mm).

TABLE 1-1

| Steel Code | Chemical Composition (mass %) | | | | | | | | | | | | Ac1 Transformation Temperature (° C.) | Note |
| --- | --- | --- | --- | --- | --- | --- | --- | --- | --- | --- | --- | --- | --- | --- |
| | C | Si | Mn | P | S | Al | N | Ni, Cu, Cr, Mo | Ti, Nb, V, W | Ca, REM, Mg | Sb | B | | |
| A | 0.150 | 0.02 | 9.00 | 0.020 | 0.020 | 0.035 | 0.004 | — | — | — | — | — | 497 | Conforming Example |
| B | 0.150 | 0.03 | 10.50 | 0.010 | 0.029 | 0.035 | 0.002 | — | — | — | — | — | 455 | Conforming Example |
| C | 0.152 | 0.03 | 7.65 | 0.035 | 0.010 | 0.031 | 0.004 | — | — | — | — | — | 535 | Conforming Example |
| D | 0.100 | 0.20 | 5.00 | 0.032 | 0.003 | 0.036 | 0.002 | — | — | — | — | — | 612 | Conforming Example |
| E | 0.105 | 0.21 | 7.00 | 0.035 | 0.002 | 0.035 | 0.003 | — | — | — | — | — | 556 | Conforming Example |
| F | 0.092 | 0.06 | 6.80 | 0.030 | 0.002 | 0.030 | 0.005 | — | — | — | — | — | 560 | Conforming Example |
| G | 0.100 | 0.25 | 7.20 | 0.032 | 0.002 | 0.045 | 0.005 | — | — | — | — | — | 551 | Conforming Example |
| H | 0.110 | 0.23 | 10.50 | 0.032 | 0.002 | 0.032 | 0.004 | — | — | — | — | — | 458 | Conforming Example |
| I | 0.145 | 0.21 | 4.00 | 0.035 | 0.002 | 0.036 | 0.002 | — | — | — | — | — | 639 | Conforming Example |
| J | 0.155 | 0.25 | 4.50 | 0.032 | 0.002 | 0.032 | 0.004 | — | — | — | — | — | 625 | Conforming Example |
| K | 0.135 | 0.30 | 4.25 | 0.031 | 0.001 | 0.038 | 0.005 | — | — | — | — | — | 633 | Conforming Example |
| L | 0.158 | 0.20 | 4.95 | 0.030 | 0.004 | 0.055 | 0.005 | — | — | — | — | — | 612 | Conforming Example |
| M | 0.160 | 0.25 | 5.25 | 0.039 | 0.003 | 0.025 | 0.006 | — | — | — | — | — | 604 | Conforming Example |
| N | 0.165 | 0.21 | 3.65 | 0.045 | 0.002 | 0.060 | 0.005 | — | — | — | — | — | 648 | Conforming Example |
| O | 0.155 | 0.20 | 6.30 | 0.030 | 0.002 | 0.035 | 0.003 | — | — | — | — | — | 574 | Conforming Example |
| P | 0.177 | 0.20 | 6.25 | 0.035 | 0.002 | 0.035 | 0.003 | — | — | — | — | — | 575 | Conforming Example |
| Q | 0.135 | 0.24 | 6.30 | 0.030 | 0.003 | 0.030 | 0.004 | — | — | — | — | — | 575 | Conforming Example |
| R | 0.155 | 0.35 | 6.80 | 0.027 | 0.002 | 0.040 | 0.004 | — | — | — | — | — | 562 | Conforming Example |
| S | 0.150 | 0.30 | 7.35 | 0.030 | 0.004 | 0.045 | 0.005 | — | — | — | — | — | 546 | Conforming Example |
| T | 0.160 | 0.20 | 5.60 | 0.041 | 0.003 | 0.045 | 0.004 | — | — | — | — | — | 594 | Conforming Example |
| U | 0.200 | 0.25 | 4.15 | 0.032 | 0.002 | 0.032 | 0.003 | — | — | — | — | — | 634 | Conforming Example |
| V | 0.294 | 0.03 | 4.05 | 0.036 | 0.004 | 0.036 | 0.006 | — | — | — | — | — | 633 | Conforming Example |
| W | 0.185 | 0.06 | 4.00 | 0.042 | 0.006 | 0.040 | 0.003 | — | — | — | — | — | 637 | Conforming Example |

TABLE 1-1-continued

| Steel Code | Chemical Composition (mass %) | | | | | | | | | | | | Ac1 Transformation Temperature (° C.) | Note |
|---|---|---|---|---|---|---|---|---|---|---|---|---|---|---|
| | C | Si | Mn | P | S | Al | N | Ni, Cu, Cr, Mo | Ti, Nb, V, W | Ca, REM, Mg | Sb | B | | |
| X | 0.215 | 0.30 | 4.43 | 0.029 | 0.006 | 0.055 | 0.003 | — | — | — | — | — | 627 | Conforming Example |
| Y | 0.226 | 0.35 | 3.65 | 0.036 | 0.007 | 0.056 | 0.004 | — | — | — | — | — | 649 | Conforming Example |
| Z | 0.230 | 0.25 | 3.55 | 0.045 | 0.006 | 0.053 | 0.002 | — | — | — | — | — | 651 | Conforming Example |

TABLE 1-2

| Steel Code | Chemical Composition (mass %) | | | | | | | | | | | | Ac1 Transformation Temperature (° C.) | Note |
|---|---|---|---|---|---|---|---|---|---|---|---|---|---|---|
| | C | Si | Mn | P | S | Al | N | Ni, Cu, Cr, Mo | Ti, Nb, V, W | Ca, REM, Mg | Sb | B | | |
| AA | 0.200 | 0.80 | 4.20 | 0.032 | 0.005 | 0.040 | 0.004 | — | — | — | — | — | 639 | Conforming Example |
| AB | 0.190 | 1.20 | 4.05 | 0.020 | 0.004 | 0.046 | 0.003 | — | — | — | — | — | 648 | Conforming Example |
| AC | 0.195 | 2.25 | 4.15 | 0.035 | 0.005 | 0.045 | 0.005 | — | — | — | — | — | 656 | Conforming Example |
| AD | 0.190 | 1.20 | 4.30 | 0.025 | 0.004 | 0.085 | 0.006 | — | — | — | — | — | 641 | Conforming Example |
| AE | 0.185 | 0.30 | 4.25 | 0.030 | 0.004 | 0.092 | 0.004 | — | — | — | — | — | 632 | Conforming Example |
| AF | 0.190 | 1.25 | 4.00 | 0.030 | 0.004 | 0.085 | 0.008 | — | — | — | — | — | 650 | Conforming Example |
| AG | 0.215 | 0.02 | 5.20 | 0.030 | 0.003 | 0.035 | 0.003 | — | — | — | — | — | 602 | Conforming Example |
| AH | 0.235 | 0.05 | 5.25 | 0.030 | 0.004 | 0.036 | 0.004 | — | — | — | — | — | 601 | Conforming Example |
| AI | 0.188 | 0.02 | 5.15 | 0.043 | 0.005 | 0.040 | 0.004 | — | — | — | — | — | 604 | Conforming Example |
| AJ | 0.220 | 0.31 | 5.60 | 0.032 | 0.002 | 0.045 | 0.003 | — | — | — | — | — | 594 | Conforming Example |
| AK | 0.221 | 0.36 | 6.20 | 0.035 | 0.001 | 0.025 | 0.002 | — | — | — | — | — | 578 | Conforming Example |
| AL | 0.223 | 0.30 | 4.80 | 0.042 | 0.001 | 0.035 | 0.003 | — | — | — | — | — | 616 | Conforming Example |
| AM | 0.230 | 0.06 | 12.00 | 0.025 | 0.020 | 0.032 | 0.002 | — | — | — | — | — | 413 | Comparative Example |
| AN | 0.085 | 0.70 | 5.25 | 0.020 | 0.006 | 0.034 | 0.005 | — | — | — | — | — | 610 | Comparative Example |
| AO | 0.220 | 0.40 | 1.50 | 0.030 | 0.002 | 0.040 | 0.005 | — | — | — | — | — | 658 | Comparative Example |
| AP | 0.220 | 0.02 | 4.30 | 0.031 | 0.004 | 0.035 | 0.005 | — | Ti: 0.03 | — | — | — | 627 | Conforming Example |
| AQ | 0.210 | 0.03 | 4.40 | 0.035 | 0.003 | 0.030 | 0.003 | — | Nb: 0.03 | — | — | — | 625 | Conforming Example |
| AR | 0.215 | 0.05 | 4.20 | 0.036 | 0.005 | 0.031 | 0.004 | — | V: 0.01 | — | — | — | 631 | Conforming Example |
| AS | 0.205 | 0.06 | 4.20 | 0.035 | 0.002 | 0.034 | 0.006 | — | W: 0.01 | — | — | — | 631 | Conforming Example |
| AT | 0.220 | 0.10 | 4.05 | 0.015 | 0.002 | 0.050 | 0.007 | — | — | REM: 0.001 | — | — | 635 | Conforming Example |
| AU | 0.195 | 0.12 | 4.20 | 0.012 | 0.003 | 0.052 | 0.005 | — | — | — | Sb: 0.008 | — | 632 | Conforming Example |
| AV | 0.197 | 0.15 | 4.05 | 0.016 | 0.005 | 0.053 | 0.006 | — | — | — | — | B: 0.003 | 636 | Conforming Example |
| AW | 0.185 | 0.20 | 4.50 | 0.030 | 0.004 | 0.070 | 0.004 | — | — | Ca: 0.003 | — | — | 624 | Conforming Example |
| AX | 0.190 | 0.15 | 4.30 | 0.050 | 0.003 | 0.070 | 0.006 | — | — | Mg: 0.003 | — | — | 629 | Conforming Example |
| AY | 0.223 | 0.02 | 4.25 | 0.035 | 0.004 | 0.030 | 0.004 | Ni: 0.02 | — | — | — | — | 628 | Conforming Example |
| AZ | 0.225 | 0.02 | 4.25 | 0.035 | 0.004 | 0.032 | 0.003 | Cu: 0.02 | — | — | — | — | 628 | Conforming Example |
| BA | 0.221 | 0.03 | 4.23 | 0.034 | 0.003 | 0.031 | 0.004 | Cr: 0.2 | — | — | — | — | 632 | Conforming Example |
| BB | 0.220 | 0.03 | 4.24 | 0.035 | 0.004 | 0.032 | 0.004 | Mo: 0.2 | — | — | — | — | 630 | Conforming Example |

*)-: impurity level

Here, some of the obtained cold-rolled steel sheets were subjected to a coating treatment in order to obtain cold-rolled steel sheets (coated steel sheets) having a coating layer on the surface thereof as indicated in Tables 2-1 through 2-3. Each of the coated steel sheets had a galvanizing layer (GI), a galvannealing layer (GA), an Al-10-mass %-Si coating layer (Al—Si), or a Zn-12-mass %-Ni coating layer (Ni—Zn). In addition, any on the coating layers had a coating weight of 30 g/m² to 60 g/m² per side.

By taking samples (having a size of 200 mm×400 mm) from these cold-rolled steel sheets, and by performing heat treatment on the samples under the conditions given in Tables 2-1 through 2-3, the raw materials of hot-pressed parts were obtained.

TABLE 2-1

| | | | Heat Treatment | | |
|---|---|---|---|---|---|
| Steel Sheet Code | Kind of Coating Layer* | Steel Code | Heating Temperature (° C.) | Holding Time (s) | Note |
| A1 | Uncoated | A | 605 | 152 | Conforming Example |
| B1 | Al—Si | B | 600 | 152 | Conforming Example |
| C1 | Zn—Ni | C | 625 | 152 | Conforming Example |
| D1 | Uncoated | D | 677 | 3600 | Conforming Example |
| E1 | GA | E | 650 | 3630 | Conforming Example |
| F1 | GI | F | 640 | 3630 | Conforming Example |
| G1 | Zn—Ni | G | 645 | 3630 | Conforming Example |
| H1 | Uncoated | H | 620 | 150 | Conforming Example |
| I1 | Uncoated | I | 670 | 125 | Conforming Example |
| J1 | Zn—Ni | J | 655 | 125 | Conforming Example |
| K1 | Zn—Ni | K | 650 | 3620 | Conforming Example |
| L1 | Uncoated | L | 645 | 3620 | Conforming Example |
| M1 | Uncoated | M | 650 | 7250 | Conforming Example |
| N1 | Zn—Ni | N | 675 | 7250 | Conforming Example |
| O1 | Zn—Ni | O | 675 | 125 | Conforming Example |
| P1 | Zn—Ni | P | 670 | 125 | Conforming Example |
| Q1 | Uncoated | Q | 675 | 3620 | Conforming Example |
| R1 | Zn—Ni | R | 682 | 3620 | Conforming Example |
| S1 | Zn—Ni | S | 675 | 7250 | Conforming Example |
| T1 | Uncoated | T | 672 | 7250 | Conforming Example |
| U1 | Uncoated | U | 670 | 3600 | Conforming Example |
| U2 | Uncoated | U | 670 | 185 | Conforming Example |
| U3 | Zn—Ni | U | 640 | 185 | Conforming Example |
| U4 | Zn—Ni | U | 720 | 185 | Conforming Example |
| U5 | Uncoated | U | 825 | 185 | Conforming Example |
| U6 | Zn—Ni | U | 860 | 185 | Comparative Example |
| U7 | Zn—Ni | U | 620 | 185 | Comparative Example |
| U8 | Zn—Ni | U | 670 | 90 | Comparative Example |
| U9 | Zn—Ni | U | 670 | 110 | Conforming Example |
| U10 | Zn—Ni | U | 670 | 600 | Conforming Example |
| U11 | Zn—Ni | U | 670 | 1800 | Conforming Example |
| U12 | Zn—Ni | U | 670 | 86400 | Conforming Example |
| U13 | Uncoated | U | 670 | 115200 | Conforming Example |
| U14 | Zn—Ni | U | 670 | 180000 | Comparative Example |

*Al—Si: Al-10-mass %—Si coating layer Zn—Ni: Zn-12-mass %—Ni coating layer

TABLE 2-2

| | | | Heat Treatment | | |
|---|---|---|---|---|---|
| Steel Sheet Code | Kind of Coating Layer* | Steel Code | Heating Temperature (° C.) | Holding Time (s) | Note |
| V1 | Zn—Ni | V | 675 | 3600 | Conforming Example |
| W1 | Zn—Ni | W | 675 | 3600 | Conforming Example |
| X1 | Uncoated | X | 670 | 3600 | Conforming Example |
| Y1 | Uncoated | Y | 690 | 3600 | Conforming Example |
| Z1 | Zn—Ni | Z | 690 | 3600 | Conforming Example |
| AA1 | Zn—Ni | AA | 680 | 3600 | Conforming Example |
| AB1 | Zn—Ni | AB | 688 | 3600 | Conforming Example |
| AC1 | Uncoated | AC | 725 | 3600 | Conforming Example |

TABLE 2-2-continued

| | | | Heat Treatment | | |
|---|---|---|---|---|---|
| Steel Sheet Code | Kind of Coating Layer* | Steel Code | Heating Temperature (° C.) | Holding Time (s) | Note |
| AD1 | Zn—Ni | AD | 675 | 3600 | Conforming Example |
| AE1 | Zn—Ni | AE | 675 | 3600 | Conforming Example |
| AF1 | Uncoated | AF | 675 | 3600 | Conforming Example |
| AG1 | Uncoated | AG | 642 | 3960 | Conforming Example |
| AG2 | Zn—Ni | AG | 642 | 3630 | Conforming Example |
| AG3 | Zn—Ni | AG | 608 | 3630 | Conforming Example |
| AG4 | Zn—Ni | AG | 725 | 3630 | Conforming Example |
| AG5 | Zn—Ni | AG | 825 | 3630 | Conforming Example |
| AG6 | Zn—Ni | AG | 865 | 3630 | Comparative Example |
| AG7 | Zn—Ni | AG | 585 | 3630 | Comparative Example |
| AG8 | Uncoated | AG | 642 | 90 | Comparative Example |
| AG9 | Zn—Ni | AG | 642 | 110 | Conforming Example |
| AG10 | Zn—Ni | AG | 642 | 600 | Conforming Example |
| AG11 | Uncoated | AG | 642 | 1800 | Conforming Example |
| AG12 | Zn—Ni | AG | 642 | 86400 | Conforming Example |
| AG13 | Zn—Ni | AG | 642 | 115200 | Conforming Example |
| AG14 | Zn—Ni | AG | 642 | 180000 | Comparative Example |
| AH1 | Zn—Ni | AH | 630 | 180 | Conforming Example |
| AI1 | Zn—Ni | AI | 630 | 180 | Conforming Example |
| AJ1 | Zn—Ni | AJ | 650 | 180 | Conforming Example |
| AK1 | Uncoated | AK | 675 | 180 | Conforming Example |
| AL1 | Zn—Ni | AL | 670 | 180 | Conforming Example |
| AM1 | Uncoated | AM | 623 | 6203 | Comparative Example |
| AN1 | Zn—Ni | AN | 674 | 5400 | Comparative Example |
| AO1 | Uncoated | AO | 685 | 6300 | Comparative Example |

*Zn—Ni: Zn-12-mass %—Ni coating layer

TABLE 2-3

| | | | Heat Treatment | | |
|---|---|---|---|---|---|
| Steel Sheet Code | Kind of Coating Layer* | Steel Code | Heating Temperature (° C.) | Holding Time (s) | Note |
| AP1 | Zn—Ni | AP | 630 | 3960 | Conforming Example |
| AQ1 | Zn—Ni | AQ | 675 | 2520 | Conforming Example |
| AR1 | Zn—Ni | AR | 654 | 2880 | Conforming Example |
| AS1 | Zn—Ni | AS | 675 | 4680 | Conforming Example |
| AT1 | Zn—Ni | AT | 642 | 2700 | Conforming Example |
| AU1 | Zn—Ni | AU | 635 | 2700 | Conforming Example |
| AV1 | Zn—Ni | AV | 675 | 2880 | Conforming Example |
| AW1 | Zn—Ni | AW | 655 | 2520 | Conforming Example |
| AX1 | Zn—Ni | AX | 656 | 3205 | Conforming Example |
| AY1 | Zn—Ni | AY | 640 | 3632 | Conforming Example |
| AZ1 | Zn—Ni | AZ | 645 | 3630 | Conforming Example |
| BA1 | Zn—Ni | BA | 640 | 3650 | Conforming Example |
| BB1 | Zn—Ni | BB | 643 | 3620 | Conforming Example |
| U15 | Zn—Ni | U | 670 | 9600 | Conforming Example |
| U16 | Zn—Ni | U | 670 | 11700 | Conforming Example |
| U17 | Zn—Ni | U | 670 | 13700 | Conforming Example |
| U18 | Zn—Ni | U | 670 | 50600 | Conforming Example |
| U19 | Zn—Ni | U | 670 | 72000 | Conforming Example |
| AG15 | Zn—Ni | AG | 642 | 16500 | Conforming Example |
| AG16 | Zn—Ni | AG | 642 | 61800 | Conforming Example |
| AG17 | Zn—Ni | AG | 642 | 9000 | Conforming Example |
| AG18 | Zn—Ni | AG | 642 | 23400 | Conforming Example |
| AG19 | Zn—Ni | AG | 642 | 28840 | Conforming Example |

*Zn—Ni: Zn-12-mass %—Ni coating layer

Subsequently, the obtained raw materials for hot-pressed parts were subjected to heating process under the conditions given in Tables 3-1 through 3-3, subjected to a hot press forming process under the conditions given in Tables 3-1 thorough 3-3, and cooled under the conditions given in Tables 3-1 through 3-3 so as to be made into parts (hot-pressed parts) having a hat shape. Here, hot pressing was performed by using a punching tool having a width of 70 mm and a shoulder radius R of 6 mm and die tool having a shoulder radius R of 6 mm with a forming depth of 30 mm.

Here, in the case where the heating process in the hot pressing was performed by using an electric heating furnace in atmospheric air, the heating rate was 3° C./s to 15° C./s in terms of average cooling rate from room temperature (RT) to 750° C. as indicated in Tables 3-1 through 3-3. In addition, in the case where the heating process was performed by using a direct energization heating device in atmospheric air, the heating rate was 3° C./s to 200° C./s in terms of average cooling rate from room temperature (RT) to 750° C. as indicated in Tables 3-1 through 3-3. The pressing start temperature was 800° C. to 500° C. In addition, in the cooling process, the punching tool was held at the bottom dead point for 1 second to 60 seconds, and cooling was performed to a temperature of 150° C. or lower by combining cooling while the hot-pressed part was interposed between the die tool and the punching tool and air cooling on the die after the hot-pressed part had been released from the interposing. The average cooling rate from the pressing temperature to 200° C. was 30° C./s to 300° C./s as indicated in Tables 3-1 through 3-3.

TABLE 3-1

| Hot-pressed Part No. | Steel Sheet Code | Steel Code | Heating Process | | | Hot Press Forming Process | | Occurrence of Scale | Note |
|---|---|---|---|---|---|---|---|---|---|
| | | | Heating Rate (° C./s) | Heating Temperature (° C.) | Holding Time (s) | Pressing Temperature (° C.) | Cooling Rate (° C./s) | | |
| 1 | A1 | A | 3 | 850 | 80 | 720 | 200 | Present | Example |
| 2 | B1 | B | 5 | 905 | 35 | 725 | 205 | None | Example |
| 3 | C1 | C | 5 | 840 | 60 | 720 | 205 | None | Example |
| 4 | D1 | D | 5 | 820 | 62 | 720 | 210 | Present | Example |
| 5 | E1 | E | 5 | 850 | 65 | 720 | 205 | None | Example |
| 6 | F1 | F | 5 | 870 | 55 | 725 | 200 | None | Example |
| 7 | G1 | G | 5 | 895 | 120 | 725 | 205 | None | Example |
| 8 | H1 | H | 5 | 855 | 120 | 725 | 210 | Present | Example |
| 9 | I1 | I | 5 | 820 | 60 | 720 | 210 | Present | Example |
| 10 | J1 | J | 5 | 830 | 50 | 720 | 210 | None | Example |
| 11 | K1 | K | 5 | 832 | 135 | 720 | 205 | None | Example |
| 12 | L1 | L | 5 | 860 | 20 | 725 | 205 | Present | Example |
| 13 | M1 | M | 5 | 890 | 35 | 725 | 210 | Present | Example |
| 14 | N1 | N | 5 | 900 | 60 | 725 | 215 | None | Example |
| 15 | O1 | O | 5 | 850 | 60 | 730 | 195 | None | Example |
| 16 | O1 | O | 5 | 780 | 60 | 725 | 195 | None | Comparative Example |
| 17 | O1 | O | 50 | 805 | 60 | 800 | 200 | None | Example |
| 18 | O1 | O | 100 | 900 | 60 | 645 | 150 | None | Example |
| 19 | O1 | O | 15 | 980 | 60 | 500 | 30 | None | Example |
| 20 | O1 | O | 5 | 1030 | 60 | 715 | 185 | None | Comparative Example |
| 21 | O1 | O | 3 | 900 | 0 | 720 | 185 | None | Example |
| 22 | O1 | O | 5 | 900 | 180 | 720 | 180 | None | Example |
| 23 | O1 | O | 5 | 900 | 580 | 725 | 185 | None | Example |
| 24 | O1 | O | 5 | 900 | 620 | 725 | 180 | None | Comparative Example |
| 25 | P1 | P | 5 | 855 | 35 | 710 | 200 | None | Example |
| 26 | Q1 | Q | 5 | 880 | 36 | 710 | 200 | Present | Example |
| 27 | R1 | R | 5 | 882 | 34 | 710 | 205 | None | Example |
| 28 | S1 | S | 5 | 875 | 39 | 710 | 210 | None | Example |
| 29 | T1 | T | 5 | 890 | 34 | 710 | 215 | Present | Example |
| 30 | U1 | U | 200 | 852 | 65 | 550 | 35 | Present | Example |
| 31 | U2 | U | 5 | 850 | 65 | 650 | 195 | Present | Example |
| 32 | U3 | U | 10 | 850 | 65 | 715 | 200 | None | Example |
| 33 | U4 | U | 15 | 850 | 65 | 715 | 200 | None | Example |
| 34 | U5 | U | 15 | 850 | 65 | 715 | 200 | Present | Example |

TABLE 3-2

| Hot-pressed Part No. | Steel Sheet Code | Steel Code | Heating Process | | | Hot Press Forming Process | | Occurrence of Scale | Note |
|---|---|---|---|---|---|---|---|---|---|
| | | | Heating Rate (° C./s) | Heating Temperature (° C.) | Holding Time (s) | Pressing Temperature (° C.) | Cooling Rate (° C./s) | | |
| 35 | U6 | U | 5 | 850 | 65 | 715 | 185 | None | Comparative Example |
| 36 | U7 | U | 5 | 850 | 65 | 715 | 185 | None | Comparative Example |
| 37 | U8 | U | 5 | 852 | 65 | 715 | 185 | None | Comparative Example |
| 38 | U9 | U | 5 | 852 | 65 | 720 | 185 | None | Example |
| 39 | U10 | U | 10 | 852 | 65 | 720 | 185 | None | Example |

TABLE 3-2-continued

| Hot-pressed Part No. | Steel Sheet Code | Steel Code | Heating Process Heating Rate (° C./s) | Heating Temperature (° C.) | Holding Time (s) | Hot Press Forming Process Pressing Temperature (° C.) | Cooling Rate (° C./s) | Occurrence of Scale | Note |
|---|---|---|---|---|---|---|---|---|---|
| 40 | U11 | U | 10 | 852 | 65 | 725 | 190 | None | Example |
| 41 | U12 | U | 5 | 852 | 65 | 725 | 190 | None | Example |
| 42 | U13 | U | 5 | 852 | 65 | 710 | 190 | Present | Example |
| 43 | U14 | U | 5 | 852 | 65 | 715 | 190 | None | Comparative Example |
| 44 | V1 | V | 5 | 845 | 150 | 720 | 185 | None | Example |
| 45 | W1 | W | 5 | 880 | 25 | 720 | 185 | None | Example |
| 46 | X1 | X | 5 | 900 | 30 | 720 | 185 | Present | Example |
| 47 | Y1 | Y | 5 | 845 | 45 | 720 | 185 | Present | Example |
| 48 | Z1 | Z | 5 | 825 | 60 | 720 | 185 | None | Example |
| 49 | AA1 | AA | 5 | 855 | 55 | 700 | 150 | None | Example |
| 50 | AB1 | AB | 5 | 850 | 80 | 700 | 150 | None | Example |
| 51 | AC1 | AC | 5 | 862 | 85 | 700 | 155 | Present | Example |
| 52 | AD1 | AD | 5 | 865 | 95 | 700 | 155 | None | Example |
| 53 | AE1 | AE | 5 | 870 | 120 | 700 | 150 | None | Example |
| 54 | AF1 | AF | 5 | 875 | 180 | 700 | 160 | Present | Example |
| 55 | AG1 | AG | 50 | 855 | 70 | 700 | 150 | Present | Example |
| 56 | AG2 | AG | 100 | 855 | 70 | 600 | 60 | None | Example |
| 57 | AG3 | AG | 5 | 855 | 70 | 700 | 65 | None | Example |
| 58 | AG4 | AG | 5 | 855 | 70 | 700 | 55 | None | Example |
| 59 | AG5 | AG | 200 | 855 | 70 | 715 | 200 | None | Example |
| 60 | AG6 | AG | 5 | 855 | 70 | 715 | 200 | None | Comparative Example |
| 61 | AG7 | AG | 5 | 855 | 70 | 720 | 200 | None | Comparative Example |
| 62 | AG8 | AG | 5 | 855 | 70 | 725 | 200 | Present | Comparative Example |
| 63 | AG9 | AG | 5 | 855 | 70 | 725 | 205 | None | Example |
| 64 | AG10 | AG | 5 | 855 | 70 | 710 | 210 | None | Example |
| 65 | AG11 | AG | 10 | 855 | 70 | 710 | 215 | Present | Example |
| 66 | AG12 | AG | 5 | 855 | 70 | 712 | 210 | Present | Example |
| 67 | AG13 | AG | 15 | 855 | 70 | 710 | 210 | Present | Example |
| 68 | AG14 | AG | 5 | 855 | 70 | 705 | 250 | Present | Comparative Example |

TABLE 3-3

| Hot-pressed Part No. | Steel Sheet Code | Steel Code | Heating Process Heating Rate (° C./s) | Heating Temperature (° C.) | Holding Time (s) | Hot Press Forming Process Pressing Temperature (° C.) | Cooling Rate (° C./s) | Occurrence of Scale | Note |
|---|---|---|---|---|---|---|---|---|---|
| 69 | AH1 | AH | 5 | 865 | 130 | 715 | 200 | None | Example |
| 70 | AI1 | AI | 5 | 865 | 150 | 720 | 215 | None | Example |
| 71 | AJ1 | AJ | 5 | 875 | 120 | 715 | 220 | None | Example |
| 72 | AK1 | AK | 5 | 880 | 125 | 715 | 250 | Present | Example |
| 73 | AL1 | AL | 5 | 875 | 120 | 712 | 200 | None | Example |
| 74 | AM1 | AM | 5 | 849 | 180 | 710 | 230 | Present | Comparative Example |
| 75 | AN1 | AN | 5 | 875 | 38 | 715 | 250 | None | Comparative Example |
| 76 | AO1 | AO | 5 | 845 | 45 | 712 | 220 | None | Comparative Example |
| 77 | AP1 | AP | 5 | 850 | 30 | 715 | 200 | None | Example |
| 78 | AQ1 | AQ | 5 | 845 | 25 | 700 | 250 | None | Example |
| 79 | AR1 | AR | 5 | 840 | 65 | 705 | 300 | None | Example |
| 80 | AS1 | AS | 5 | 846 | 70 | 705 | 250 | None | Example |
| 81 | AT1 | AT | 5 | 835 | 84 | 715 | 250 | None | Example |
| 82 | AU1 | AU | 5 | 830 | 80 | 712 | 220 | None | Example |
| 83 | AV1 | AV | 5 | 855 | 95 | 715 | 215 | None | Example |
| 84 | AW1 | AW | 5 | 865 | 105 | 750 | 200 | None | Example |
| 85 | AX1 | AX | 5 | 870 | 130 | 745 | 220 | None | Example |
| 86 | AY1 | AY | 5 | 850 | 30 | 740 | 215 | None | Example |
| 87 | AZ1 | AZ | 5 | 855 | 25 | 745 | 220 | None | Example |
| 88 | BA1 | BA | 5 | 860 | 30 | 720 | 225 | None | Example |
| 89 | BB1 | BB | 5 | 855 | 30 | 715 | 220 | None | Example |
| 90 | U15 | U | 5 | 852 | 65 | 715 | 200 | None | Example |
| 91 | U16 | U | 5 | 852 | 65 | 715 | 215 | None | Example |

TABLE 3-3-continued

| | | | Heating Process | | | Hot Press Forming Process | | | |
|---|---|---|---|---|---|---|---|---|---|
| Hot-pressed Part No. | Steel Sheet Code | Steel Code | Heating Rate (° C./s) | Heating Temperature (° C.) | Holding Time (s) | Pressing Temperature (° C.) | Cooling Rate (° C./s) | Occurrence of Scale | Note |
| 92 | U17 | U | 5 | 852 | 65 | 720 | 200 | None | Example |
| 93 | U18 | U | 5 | 852 | 65 | 700 | 210 | None | Example |
| 94 | U19 | U | 5 | 852 | 65 | 695 | 215 | None | Example |
| 95 | AG15 | AG | 5 | 855 | 70 | 650 | 205 | None | Example |
| 96 | AG16 | AG | 5 | 855 | 70 | 655 | 215 | None | Example |
| 97 | AG17 | AG | 5 | 855 | 70 | 650 | 220 | None | Example |
| 98 | AG18 | AG | 5 | 855 | 70 | 645 | 210 | None | Example |
| 99 | AG19 | AG | 5 | 855 | 70 | 645 | 205 | None | Example |

By taking a JIS No. 5 tensile test piece (whose parallel part had a width of 25 mm and a length of 60 mm and whose GL was 50 mm) from the top panel of the hat of the obtained hot-pressed part, by performing a tensile test in accordance with JIS Z 2241, tensile properties (tensile strength TS, total elongation tEl, and uniform elongation uEl) were determined.

In addition, a test piece for microstructure observation was taken from the top panel of the hat of the obtained hot-pressed part so that a cross section parallel to the rolling direction located at ¼ of the thickness was the observation surface. By polishing the observation surface, by then etching the polished surface by using a 3-vol. %-nital solution in order to expose the microstructure, and by then observing the microstructure by using a scanning electron microscope (at a magnification of 2000 times), a photograph was obtained. By performing image analysis on the obtained microstructure photograph, microstructures were identified, and microstructure fractions were determined.

Here, the identification of microstructure and the determination of microstructure fractions were performed as follows.

After having identified microstructures in a square area of 50 μm square, the occupation area fraction of each of constituent phases were determined, and then the area fraction was converted into the volume fraction of the phase.

Here, from the observation of the microstructure photograph obtained by using a scanning electron microscope, a phase having a comparatively smooth surface and a black appearance was identified as a ferrite phase, a phase at grain boundaries which has a film or blocky shape and a white appearance was identified as cementite, a phase in which a ferrite phase and cementite are formed in layers was identified as pearlite (here, there is a case where pearlite does not have a layered appearance dependently on the growth direction of pearlites), and a phase in which carbides were formed between laths and a phase which was composed of bainitic ferrite which did not have carbides in an intra-grain region were identified as a bainite phase. Here, the volume fraction of a martensite phase was calculated by subtracting the total volume fraction of all the phases described above and a retained austenite phase from 100%.

In addition, after having taken a test piece for X-ray diffraction analysis from the top panel of the hat of the obtained hot-pressed part so that a cross section located at ¼ of the thickness was the diffraction surface, and having performing mechanical polishing and electrolytic polishing on the diffraction surface, by performing X-ray diffraction analysis, the volume ratio of an austenite phase was determined. Here, by determining the integrated X-ray diffraction intensities of the {200} plane, {220} plane, and {311} plane of austenite (γ) and {200} plane and {211} plane of ferrite (α) by using an X-ray diffraction method, and by determining the intensity ratio of each of all the combinations of the peak integrated intensities, the average value of these intensity ratio was defined as the volume fraction of a retained austenite phase. Here, the radiation source was Co.

The obtained results are given in Tables 4-1 through 4-3.

TABLE 4-1

| Hot-pressed Part No. | Steel Sheet Code | Steel Code | Microstructure (vol. %) | | | Tensile Property | | | Note |
|---|---|---|---|---|---|---|---|---|---|
| | | | Retained Austenite | Martensite | Other* | Tensile Strength TS (MPa) | Uniform Elongation uEl (%) | Total Elongation tEl (%) | |
| 1 | A1 | A | 6.6 | 93.4 | — | 2157 | 7.6 | 10.5 | Example |
| 2 | B1 | B | 8.6 | 91.4 | — | 2253 | 9.4 | 12.5 | Example |
| 3 | C1 | C | 5.7 | 94.3 | — | 2000 | 7.5 | 10.5 | Example |
| 4 | D1 | D | 4.2 | 95.8 | — | 1512 | 7.0 | 12.0 | Example |
| 5 | E1 | E | 5.8 | 94.2 | — | 1751 | 7.1 | 11.4 | Example |
| 6 | F1 | F | 5.0 | 95.0 | — | 1775 | 7.2 | 10.4 | Example |
| 7 | G1 | G | 5.5 | 94.5 | — | 1802 | 7.9 | 11.1 | Example |
| 8 | H1 | H | 9.6 | 90.4 | — | 2153 | 9.4 | 12.9 | Example |
| 9 | I1 | I | 5.0 | 95.0 | — | 1524 | 8.0 | 11.5 | Example |
| 10 | J1 | J | 4.5 | 95.5 | — | 1621 | 7.2 | 10.2 | Example |
| 11 | K1 | K | 4.6 | 95.4 | — | 1627 | 6.8 | 10.3 | Example |
| 12 | L1 | L | 5.2 | 94.8 | — | 1682 | 7.6 | 10.8 | Example |
| 13 | M1 | M | 5.4 | 94.6 | — | 1660 | 7.0 | 10.5 | Example |
| 14 | N1 | N | 4.9 | 95.1 | — | 1687 | 7.3 | 10.3 | Example |
| 15 | O1 | O | 4.5 | 95.5 | — | 1817 | 7.5 | 11.0 | Example |

TABLE 4-1-continued

| Hot-pressed Part No. | Steel Sheet Code | Steel Code | Microstructure (vol. %) Retained Austenite | Martensite | Other* | Tensile Property Tensile Strength TS (MPa) | Uniform Elongation uEl (%) | Total Elongation tEl (%) | Note |
|---|---|---|---|---|---|---|---|---|---|
| 16 | O1 | O | 12.0 | 88.0 | — | 1186 | 15.0 | 18.5 | Comparative Example |
| 17 | O1 | O | 4.5 | 95.5 | — | 1820 | 7.4 | 10.6 | Example |
| 18 | O1 | O | 4.5 | 95.5 | — | 1815 | 7.2 | 10.7 | Example |
| 19 | O1 | O | 4.3 | 95.7 | — | 1817 | 7.0 | 10.0 | Example |
| 20 | O1 | O | 1.5 | 98.5 | — | 1823 | 5.3 | 9.0 | Comparative Example |
| 21 | O1 | O | 4.4 | 95.6 | — | 1820 | 7.5 | 11.0 | Example |
| 22 | O1 | O | 4.6 | 95.4 | — | 1815 | 7.3 | 10.5 | Example |
| 23 | O1 | O | 4.5 | 95.5 | — | 1814 | 7.5 | 11.0 | Example |
| 24 | O1 | O | 1.5 | 98.5 | — | 1813 | 5.2 | 8.4 | Comparative Example |
| 25 | P1 | P | 4.5 | 95.5 | — | 1903 | 7.1 | 10.1 | Example |
| 26 | Q1 | Q | 5.2 | 94.8 | — | 1850 | 7.2 | 10.7 | Example |
| 27 | R1 | R | 4.6 | 95.4 | — | 1871 | 7.0 | 10.2 | Example |
| 28 | S1 | S | 6.2 | 93.8 | — | 1910 | 6.7 | 10.2 | Example |
| 29 | T1 | T | 4.7 | 95.3 | — | 1878 | 6.6 | 10.1 | Example |
| 30 | U1 | U | 5.0 | 95.0 | — | 1837 | 7.2 | 10.2 | Example |
| 31 | U2 | U | 6.0 | 94.0 | — | 1837 | 8.0 | 11.2 | Example |
| 32 | U3 | U | 5.8 | 94.2 | — | 1840 | 7.0 | 10.5 | Example |
| 33 | U4 | U | 5.2 | 94.8 | — | 1853 | 7.5 | 11.0 | Example |
| 34 | U5 | U | 4.8 | 95.2 | — | 1844 | 7.0 | 10.0 | Example |

*P: Pearlite

TABLE 4-2

| Hot-pressed Part No. | Steel Sheet Code | Steel Code | Microstructure (vol. %) Retained Austenite | Martensite | Other* | Tensile Property Tensile Strength TS (MPa) | Uniform Elongation uEl (%) | Total Elongation tEl (%) | Note |
|---|---|---|---|---|---|---|---|---|---|
| 35 | U6 | U | 0.5 | 99.5 | — | 1840 | 5.0 | 8.0 | Comparative Example |
| 36 | U7 | U | 2.1 | 97.9 | — | 1841 | 5.3 | 8.8 | Comparative Example |
| 37 | U8 | U | 1.2 | 98.8 | — | 1842 | 5.2 | 8.4 | Comparative Example |
| 38 | U9 | U | 5.7 | 94.3 | — | 1844 | 7.2 | 10.2 | Example |
| 39 | U10 | U | 6.2 | 93.8 | — | 1852 | 7.8 | 11.3 | Example |
| 40 | U11 | U | 7.0 | 93.0 | — | 1850 | 8.2 | 11.4 | Example |
| 41 | U12 | U | 6.2 | 93.8 | — | 1850 | 8.0 | 11.5 | Example |
| 42 | U13 | U | 7.0 | 93.0 | — | 1849 | 8.5 | 11.5 | Example |
| 43 | U14 | U | 2.0 | 86.0 | P: 12.0 | 1848 | 4.8 | 7.8 | Comparative Example |
| 44 | V1 | V | 4.2 | 95.8 | — | 1906 | 7.2 | 10.7 | Example |
| 45 | W1 | W | 3.8 | 96.2 | — | 1808 | 6.5 | 10.2 | Example |
| 46 | X1 | X | 4.8 | 95.2 | — | 1864 | 7.2 | 10.7 | Example |
| 47 | Y1 | Y | 4.1 | 95.9 | — | 1825 | 6.8 | 10.6 | Example |
| 48 | Z1 | Z | 4.0 | 96.0 | — | 1947 | 6.9 | 10.4 | Example |
| 49 | AA1 | AA | 4.6 | 95.4 | — | 1840 | 7.0 | 10.5 | Example |
| 50 | AB1 | AB | 5.0 | 95.0 | — | 1789 | 7.9 | 10.9 | Example |
| 51 | AC1 | AC | 3.8 | 96.2 | — | 1791 | 7.2 | 10.7 | Example |
| 52 | AD1 | AD | 4.6 | 95.4 | — | 1798 | 7.8 | 11.0 | Example |
| 53 | AE1 | AE | 5.0 | 95.0 | — | 1820 | 7.6 | 11.1 | Example |
| 54 | AF1 | AF | 5.2 | 94.8 | — | 1790 | 7.5 | 11.0 | Example |
| 55 | AG1 | AG | 5.2 | 94.8 | — | 2014 | 7.5 | 10.7 | Example |
| 56 | AG2 | AG | 5.2 | 94.8 | — | 2014 | 7.5 | 11.0 | Example |
| 57 | AG3 | AG | 7.5 | 92.5 | — | 2022 | 8.8 | 11.8 | Example |
| 58 | AG4 | AG | 7.8 | 92.2 | — | 2023 | 9.0 | 12.5 | Example |
| 59 | AG5 | AG | 7.6 | 92.4 | — | 2030 | 9.2 | 12.5 | Example |
| 60 | AG6 | AG | 0.4 | 99.6 | — | 2026 | 4.8 | 8.3 | Comparative Example |
| 61 | AG7 | AG | 2.0 | 98.0 | — | 2018 | 5.0 | 8.2 | Comparative Example |
| 62 | AG8 | AG | 1.0 | 99.0 | — | 2017 | 4.9 | 8.4 | Comparative Example |

TABLE 4-2-continued

| Hot-pressed Part No. | Steel Sheet Code | Steel Code | Microstructure (vol. %) | | | Tensile Property | | | Note |
|---|---|---|---|---|---|---|---|---|---|
| | | | Retained Austenite | Martensite | Other* | Tensile Strength TS (MPa) | Uniform Elongation uEl (%) | Total Elongation tEl (%) | |
| 63 | AG9 | AG | 5.6 | 94.4 | — | 2023 | 7.1 | 10.1 | Example |
| 64 | AG10 | AG | 6.2 | 93.8 | — | 2026 | 8.0 | 11.5 | Example |
| 65 | AG11 | AG | 7.5 | 92.5 | — | 2019 | 8.8 | 12.0 | Example |
| 66 | AG12 | AG | 7.5 | 92.5 | — | 2029 | 8.8 | 12.3 | Example |
| 67 | AG13 | AG | 7.8 | 92.2 | — | 2028 | 9.0 | 12.5 | Example |
| 68 | AG14 | AG | 1.8 | 83.2 | P: 15.0 | 2026 | 4.5 | 7.5 | Comparative Example |

*P: Pearlite

TABLE 4-3

| Hot-pressed Part No. | Steel Sheet Code | Steel Code | Microstructure (vol. %) | | | Tensile Property | | | Note |
|---|---|---|---|---|---|---|---|---|---|
| | | | Retained Austenite | Martensite | Other* | Tensile Strength TS (MPa) | Uniform Elongation uEl (%) | Total Elongation tEl (%) | |
| 69 | AH1 | AH | 4.3 | 95.7 | — | 2036 | 7.3 | 10.5 | Example |
| 70 | AI1 | AI | 4.6 | 96.5 | — | 2046 | 6.8 | 10.3 | Example |
| 71 | AJ1 | AJ | 6.0 | 94.0 | — | 2012 | 7.3 | 10.3 | Example |
| 72 | AK1 | AK | 5.2 | 94.8 | — | 2081 | 7.0 | 10.5 | Example |
| 73 | AL1 | AL | 5.4 | 94.6 | — | 2054 | 7.0 | 10.5 | Example |
| 74 | AM1 | AM | 1.2 | 98.8 | — | 2450 | 4.0 | 7.5 | Comparative Example |
| 75 | AN1 | AN | 4.7 | 95.3 | — | 1410 | 7.2 | 10.2 | Comparative Example |
| 76 | AO1 | AO | 2.5 | 97.5 | — | 1767 | 5.0 | 9.0 | Comparative Example |
| 77 | AP1 | AP | 4.5 | 95.5 | — | 1869 | 6.5 | 10.2 | Example |
| 78 | AQ1 | AQ | 4.6 | 95.4 | — | 1956 | 7.0 | 11.4 | Example |
| 79 | AR1 | AR | 5.0 | 95.0 | — | 1935 | 7.1 | 12.0 | Example |
| 80 | AS1 | AS | 5.3 | 94.7 | — | 1914 | 7.1 | 11.5 | Example |
| 81 | AT1 | AT | 5.4 | 94.6 | — | 1960 | 7.2 | 12.0 | Example |
| 82 | AU1 | AU | 4.8 | 95.2 | — | 1872 | 6.6 | 11.0 | Example |
| 83 | AV1 | AV | 4.7 | 95.3 | — | 1864 | 6.8 | 11.7 | Example |
| 84 | AW1 | AW | 5.2 | 94.8 | — | 1863 | 6.9 | 11.8 | Example |
| 85 | AX1 | AX | 5.1 | 94.9 | — | 1862 | 7.4 | 11.9 | Example |
| 86 | AY1 | AY | 4.5 | 95.5 | — | 1900 | 6.5 | 10.7 | Example |
| 87 | AZ1 | AZ | 4.6 | 95.4 | — | 1892 | 6.5 | 10.0 | Example |
| 88 | BA1 | BA | 4.3 | 95.7 | — | 1895 | 6.6 | 10.5 | Example |
| 89 | BB1 | BB | 5.0 | 95.0 | — | 1905 | 6.5 | 10.0 | Example |
| 90 | U15 | U | 10.4 | 89.6 | — | 1850 | 10.2 | 13.4 | Example |
| 91 | U16 | U | 10.0 | 90.0 | — | 1855 | 10.5 | 14.0 | Example |
| 92 | U17 | U | 10.9 | 89.2 | — | 1852 | 9.9 | 13.3 | Example |
| 93 | U18 | U | 12.0 | 88.0 | — | 1850 | 12.1 | 15.7 | Example |
| 94 | U19 | U | 10.0 | 90.0 | — | 1853 | 9.7 | 13.2 | Example |
| 95 | AG15 | AG | 12.0 | 88.0 | — | 2015 | 11.6 | 14.7 | Example |
| 96 | AG16 | AG | 11.5 | 88.5 | — | 2022 | 12.4 | 15.7 | Example |
| 97 | AG17 | AG | 10.1 | 89.9 | — | 2018 | 10.6 | 14.1 | Example |
| 98 | AG18 | AG | 15.9 | 85.3 | — | 2017 | 12.9 | 16.2 | Example |
| 99 | AG19 | AG | 16.5 | 84.7 | — | 2019 | 13.7 | 16.7 | Example |

*)P: Pearlite

The examples of the disclosed embodiments were all high-strength hot-pressed parts having high uniform elongation which had a tensile strength TS of 1500 MPa or more and a uniform elongation uEl of 6.0% or more. On the other hand, comparative examples, which were out of the range according to the disclosed embodiments, had a tensile strength TS of less than 1500 MPa or a poor elongation property represented by a uniform elongation uEl of less than 6.0% as a result of the volume fraction of retained austenite being less than 3.0%.

The invention claimed is:
1. A high-strength hot-pressed part obtained by performing a hot pressing process on a steel sheet, the part having a chemical composition comprising, by mass %:
C: 0.090% or more and less than 0.30%;
Mn: 3.5% or more and less than 11.0%;
Si: 0.01% to 2.5%;
P: 0.05% or less;
S: 0.05% or less;
Al: 0.005% to 0.1%;
N: 0.01% or less; and the balance being Fe and inevitable impurities, the part having (i) a microstructure including, in terms of volume fraction, 80% or more of a martensite phase, in a range of 3.0% to 20.0% of a retained austenite phase, (ii) a tensile strength TS of 1500 MPa or more, and (iii) a uniform elongation uEl of 6.0% or more.

2. The high-strength hot-pressed part according to claim 1, wherein the chemical composition further comprises, by mass %, at least one selected from the group consisting of:
  group A: at least one selected from the group consisting of Ni: 0.01% to 5.0%, Cu: 0.01% to 5.0%, Cr: 0.01% to 5.0%, and Mo: 0.01% to 3.0%,
  group B: at least one selected from the group consisting of Ti: 0.005% to 3.0%, Nb: 0.005% to 3.0%, V: 0.005% to 3.0%, and W: 0.005% to 3.0%,
  group C: at least one selected from the group consisting of REM: 0.0005% to 0.01%, Ca: 0.0005% to 0.01%, and Mg: 0.0005% to 0.01%,
  group D: Sb: 0.002% to 0.03%, and
  group E: B: 0.0005% to 0.05%.

3. The high-strength hot-pressed part according to claim 1, further comprising a coating layer formed on a surface of the part.

4. The high-strength hot-pressed part according to claim 3, wherein the coating layer is a Zn-based coating layer or an Al-based coating layer.

5. The high-strength hot-pressed part according to claim 4, wherein the Zn-based coating layer is a Zn—Ni-based coating layer comprising Ni: 10 mass % to 25 mass %.

6. The high-strength hot-pressed part according to claim 2, further comprising a coating layer formed on a surface of the part.

7. The high-strength hot-pressed part according to claim 6, wherein the coating layer is a Zn-based coating layer or an Al-based coating layer.

8. The high-strength hot-pressed part according to claim 7, wherein the Zn-based coating layer is a Zn—Ni-based coating layer comprising Ni: 10 mass % to 25 mass %.

9. A method for manufacturing a high-strength hot-pressed part to obtain a hot-pressed part having a specified shape, the method comprising:
  performing a heating process to form a raw material by (i) heating a cold-rolled steel sheet having a chemical composition comprising, by mass %, C: 0.090% or more and less than 0.30%, Mn: 3.5% or more and less than 11.0%, Si: 0.01% to 2.5%, P: 0.05% or less, S: 0.05% or less, Al: 0.005% to 0.1%, N: 0.01% or less, and the balance being Fe and inevitable impurities, to a temperature in a range equal to or higher than the Ac1 transformation temperature and 850° C. or lower, (ii) holding the heated steel sheet at the temperature for 100 seconds or more and 48 hours or less, and then (iii) cooling the held steel sheet; and
  subsequently performing a hot press forming process to heat the formed raw material at a temperature in a range of 800° C. to 1000° C. for 600 seconds or less, the formed raw material being subjected to press forming and quenching at the same time by using a forming tool,
  wherein the part has a tensile strength TS of 1500 MPa or more and a uniform elongation uEl of 6.0% or more.

10. The method for manufacturing a high-strength hot-pressed part according to claim 9, wherein the chemical composition further comprises, by mass %, at least one selected from the group consisting of:
  group A: at least one selected from the group consisting of Ni: 0.01% to 5.0%, Cu: 0.01% to 5.0%, Cr: 0.01% to 5.0%, and Mo: 0.01% to 3.0%,
  group B: at least one selected from the group consisting of Ti: 0.005% to 3.0%, Nb: 0.005% to 3.0%, V: 0.005% to 3.0%, and W: 0.005% to 3.0%,
  group C: at least one selected from the group consisting of REM: 0.0005% to 0.01%, Ca: 0.0005% to 0.01%, and Mg: 0.0005% to 0.01%,
  group D: Sb: 0.002% to 0.03%, and
  group E: B: 0.0005% to 0.05%.

11. The method for manufacturing a high-strength hot-pressed part according to claim 9, further comprising forming a coating layer on a surface of the cold-rolled steel sheet.

12. The method for manufacturing a high-strength hot-pressed part according to claim 11, wherein the coating layer is a Zn-based coating layer or an Al-based coating layer.

13. The method for manufacturing a high-strength hot-pressed part according to claim 12, wherein the Zn-based coating layer is a Zn—Ni-based coating layer comprising Ni: 10 mass % to 25 mass %.

14. The method for manufacturing a high-strength hot-pressed part according to claim 11, wherein the coating layer has a coating weight in a range of 10 g/m$^2$ to 90 g/m$^2$ per side.

15. The method for manufacturing a high-strength hot-pressed part according to claim 10, further comprising forming a coating layer on a surface of the cold-rolled steel sheet.

16. The method for manufacturing a high-strength hot-pressed part according to claim 15, wherein the coating layer is a Zn-based coating layer or an Al-based coating layer.

17. The method for manufacturing a high-strength hot-pressed part according to claim 16, wherein the Zn-based coating layer is a Zn—Ni-based coating layer comprising Ni: 10 mass % to 25 mass %.

18. The method for manufacturing a high-strength hot-pressed part according to claim 12, wherein the coating layer has a coating weight in a range of 10 g/m$^2$ to 90 g/m$^2$ per side.

19. The method for manufacturing a high-strength hot-pressed part according to claim 13, wherein the coating layer has a coating weight in a range of 10 g/m$^2$ to 90 g/m$^2$ per side.

20. The method for manufacturing a high-strength hot-pressed part according to claim 15, wherein the coating layer has a coating weight in a range of 10 g/m$^2$ to 90 g/m$^2$ per side.

21. The method for manufacturing a high-strength hot-pressed part according to claim 16, wherein the coating layer has a coating weight in a range of 10 g/m$^2$ to 90 g/m$^2$ per side.

22. The method for manufacturing a high-strength hot-pressed part according to claim 17, wherein the coating layer has a coating weight in a range of 10 g/m$^2$ to 90 g/m$^2$ per side.

* * * * *